United States Patent
Khan et al.

(10) Patent No.: US 11,272,042 B2
(45) Date of Patent: Mar. 8, 2022

(54) METHODS AND SYSTEMS TO TRACK PROTOCOL AND HARDWARE RESOURCE STATE TRANSITIONS

(71) Applicant: Cisco Technology, Inc., San Jose, CA (US)

(72) Inventors: Riaz Khan, Milpitas, CA (US); Peter Geoffrey Jones, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 79 days.

(21) Appl. No.: 16/748,256

(22) Filed: Jan. 21, 2020

(65) Prior Publication Data

US 2021/0227053 A1 Jul. 22, 2021

(51) Int. Cl.
| | | |
|---|---|---|
| *H04L 29/06* | (2006.01) | |
| *H04L 12/26* | (2006.01) | |
| *H04L 12/751* | (2013.01) | |
| *H04L 12/937* | (2013.01) | |
| *H04L 12/931* | (2013.01) | |
| *H04L 29/08* | (2006.01) | |
| *H04L 69/12* | (2022.01) | |
| *H04L 43/028* | (2022.01) | |
| *H04L 45/02* | (2022.01) | |
| *H04L 49/253* | (2022.01) | |

(Continued)

(52) U.S. Cl.
CPC ............ *H04L 69/12* (2013.01); *H04L 43/028* (2013.01); *H04L 45/02* (2013.01); *H04L 49/254* (2013.01); *H04L 49/65* (2013.01); *H04L 67/1002* (2013.01)

(58) Field of Classification Search
CPC ....... H04L 69/12; H04L 43/028; H04L 45/02; H04L 49/65; H04L 67/1002; H04L 49/254
See application file for complete search history.

(56) References Cited

U.S. PATENT DOCUMENTS

| 9,100,329 B1 * | 8/2015 | Jiang ................... H04L 41/0663 |
| 2010/0002577 A1 * | 1/2010 | Moreno ................ H04L 41/12 370/221 |

(Continued)

FOREIGN PATENT DOCUMENTS

EP 1788752 5/2007

OTHER PUBLICATIONS

International Search Report and Written Opinion, dated Apr. 30, 2021, received in connection with corresponding International Patent Application No. PCT/US2021/014298.

*Primary Examiner* — Charles C Jiang
*Assistant Examiner* — Shawn D Miller
(74) *Attorney, Agent, or Firm* — Meunier Carlin & Curfman LLC

(57) ABSTRACT

Embodiments of the present disclosure are directed to protocol state transition and/or resource state transition tracker configured to monitor, e.g., via filters, for certain protocol state transitions/changes or host hardware resource transitions/changes when a host processor in the control plane that performs such monitoring functions is unavailable or overloaded. The filters, in some embodiments, are pre-computed/ computed by the host processor and transmitted to the protocol state transition and/or resource state transition tracker. The protocol state transition and/or resource state transition tracker may be used to implement a fast upgrade operation as well as load sharing and or load balancing operation with control plane associated components.

18 Claims, 17 Drawing Sheets

(51) Int. Cl.
  *H04L 49/65*   (2022.01)
  *H04L 67/1001*   (2022.01)

(56) References Cited

U.S. PATENT DOCUMENTS

| | | | |
|---|---|---|---|
| 2015/0142988 A1* | 5/2015 | Wen | H04L 69/324 |
| | | | 709/230 |
| 2016/0373302 A1* | 12/2016 | Sigoure | H04L 41/0853 |
| 2019/0007288 A1 | 1/2019 | Wen et al. | |
| 2019/0042730 A1* | 2/2019 | Yamada | G06F 21/52 |
| 2019/0227812 A1* | 7/2019 | Akkineni | G06F 9/4416 |
| 2020/0154317 A1* | 5/2020 | Deng | H04W 28/0284 |

\* cited by examiner

METHODS AND SYSTEMS TO TRACK PROTOCOL AND HARDWARE RESOURCE STATE TRANSITIONS

TECHNICAL FIELD

Embodiments of the present invention relate to networking equipment, in particular, hardware and software architecture and components that track and update data-plane protocol transitions or hardware state transitions in networking equipment.

BACKGROUND

Modern networking devices such as switches are configured with a data plane (also referred to as the forwarding plane), a control plane, and a management plane.

The data or forwarding plane comprises an amalgamation of hardware and software components that are optimized for speed of processing, and for simplicity and regularity that are responsible for the forwarding of packets through the networking device. The data plane relies on routing and/or forwarding tables that are maintained in high-speed, often customized, memory of the data plane. In most implementations, data plane components typically include route or network processors that interfaces with application-specific integrated circuits (ASICs) and the high-speed memory across dedicated data buses or switch fabrics.

The control plane operates with the data plane and is primarily responsible for the populating and updating of the routing or forwarding tables, among other things. Control plane hardware components are typically optimized for customizability, handling policies, handling exceptions and are often implemented via microprocessor(s) (often referred to as a host processor(s)) that implements instructions stored in local memory.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF THE EXAMPLE EMBODIMENTS

Overview

Figure 1A:
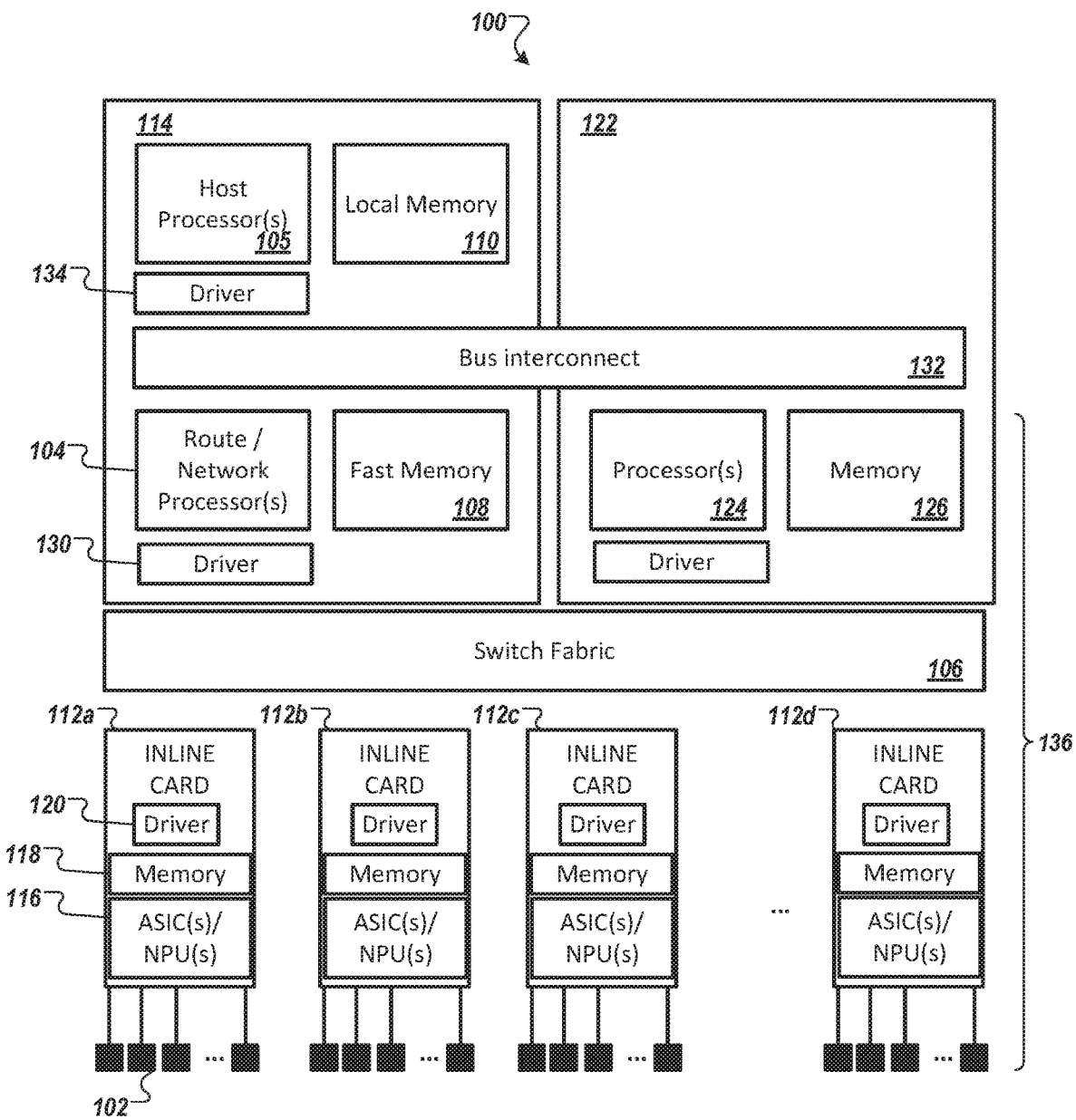
FIG. 1A is a diagram of an exemplary network device configured with a protocol state transition and/or resource state transition tracking module in accordance with an illustrative embodiment.

In an aspect, an embodiment of the present disclosure is directed to a protocol state transition and/or resource state transition tracker configured to monitor, e.g., via filters, for certain protocol state transitions/changes or host hardware resource transitions/changes when a host processor (also referred to herein as a "host CPU") in the control plane that performs such monitoring functions is unavailable or overloaded. The filters, in some embodiments, are pre-computed, prior to the host processor becoming unavailable, by the host processor and transmitted to the protocol state transition and/or resource state transition tracker, e.g., executed in a data plane component, when the host processor is unavailable or overloaded.

Subsequently, appropriate routing or forwarding tables of the data plane are updated for a given detected transition. In some embodiments, the exemplary protocol state transition or resource state transition tracker stores the detected transition to be later updated by the host processor when the host processor becomes available. In other embodiments, the host processor off-loads the tracking and/or updating of certain protocol state transition changes or host hardware resource transition changes to the exemplary protocol state transition or resource state transition tracker, thus freeing resources of the host processor with respect to such protocol state transition changes or host hardware resource transition changes.

In some embodiments, the exemplary protocol state transition and/or resource state transition tracker is used to monitor for certain protocol state transition changes or host hardware resource changes during a bootup operation or a software upgrade operation that makes the host processor unavailable. The exemplary protocol state-machine or resource tracker can thus act as a proxy for the host processor in keeping certain routing and forwarding tables synchronized to various protocol states of the network. Because the time to create data plane resources (e.g., MAC learning tables, RIB tables, ACL tables, etc.) for forwarding processes/applications can be in the order of minutes, an upgrade of the operating system or application(s) execution on the host processor and the subsequent booting of the host processor and building of such data plane resources may disrupt network operations for such time period. Indeed, the exemplary protocol state transition and/or resource state transition tracker may facilitate near-instantaneous upgrade operation of switching network devices, e.g., when operating in concert with available fast upgrade technology while providing shorter overall system down-time as compared to use of available fast upgrade technology by themselves, as well as to improve system resource utilization (e.g., in load sharing operation or in load balancing operation) and operation by acting as a proxy for the host processor in updating certain data plane resources. As used herein, "load sharing" refers to the off-loading of certain control plane functions from the host processor to the protocol state transition and/or resource state transition tracker; thus, the load on the host processor is shared. And, "load balancing" refers to the protocol state transition and/or resource state transition tracker taking on parts of the control plane load of the host processor when the host processor is overloaded.

With respect to fast upgrades, although upgrades are available for applications and operating system executing on the host CPU, because of the disruption to the network, such upgrades are often deferred until more substantial upgrades are required or scheduled. To this end, security and bug fixes may persist for a longer duration on a given network equipment. Further, in some operating environments, e.g. real-time controls in factory automation and such, disruption of network connectivity for a minute or more may cause the entire operation line to reset. Reducing disruption time during minor upgrades to a few seconds can avoid such disruptions and thus may increase the frequency that upgrades are performed, thereby improving overall system health and security.

The term "data-plane processor" (and "data plane devices") as used herein, generally refers to a processing unit involved in switching and/or routing of packets in the network device as part of the data-plane. Data-plane processors may include network processors (NPUs), route processors (RPs), switching-ASICs (application-specific integrated circuit), switching FPGA (field-programmable gate array), CPLD (complex programmable logic device), and the like. Data-plane processors are part of the data-plane, which further includes data-plane resources operatively coupled to, or are part of, the data-plane processors. Examples of data plane resources may include, but are not limited to, MAC address table(s), FIB table(s), RIB table(s), ACL table(s), and any other tables, register contents, content address memory (CAM) contents, tertiary content address memory (TCAM) contents, binary content-addressable memory (BCAM) contents, and memory contents (e.g., non-persistent, volatile, etc.) maintained or used by data-plane processors.

The term "host processor", as used herein, is used interchangeably with the term "host CPU" and generally refers to cores of a microprocessor or microcontroller, e.g., having RISC or CISC architecture, that are configured to execute computer instructions within the framework of an operating system in a networking device.

In an aspect, a network device (e.g. switch) is presented comprising a host CPU executing instructions for control-plane operations that manage and maintain a plurality of data-plane-associated tables (e.g., L2 MAC table; MAC learning tables; L3 tables; RIB, FIB, etc.) of a switch-fabric of the network device, the instructions when executed by the host CPU further computes a plurality of filters to identify protocol state and/or resource state transitions; and a processor unit or logic circuit (i.e., a non-host CPU component, e.g., logic circuits of NPU, RP, ASIC, switching-FPGA, or a core located therein, remote device) configured to receive the plurality of filters computed by the host CPU; and track, via the plurality of filters, protocol state and/or resource state transitions of the control-plane (e.g., during an unavailable, overloaded state of the control-plane or as a normal course of operation in parallel to the host CPU), wherein the tracked protocol state and/or resources are used, by the host CPU or the processor unit or logic circuit, to update the plurality of data-plane associated tables.

In some embodiments, the tracked protocol state and/or resources are used by the processor unit or logic circuit to update the data-plane when the host CPU is in the unavailable or overloaded state.

In some embodiments, the tracked protocol state and/or resources are used by the host CPU to update the data-plane of a detected protocol state and/or resources when the host CPU transitions from the unavailable or overloaded state to an available state.

In some embodiments, the tracked protocol state and/or resources are used by the processor unit or logic circuit to update the data-plane in parallel with host CPU operations.

In some embodiments, the network device comprises a data-plane device (e.g., NPU, switching ASIC) that uses said plurality of data-plane-associated tables to route packets received at network ports of the network device to other network ports of the network device, wherein the processor unit or logic circuit is implemented in the data plane device.

In some embodiments, the processor unit or logic circuit is implemented in a remote device external to the data plane.

In some embodiments, the data-plane implements a filter to monitor for a specific protocol state transition in a received packet during the unavailable state of the host CPU and/or a specific resource state transition during the unavailable state of the host CPU.

In some embodiments, the plurality of filters are pre-computed by the host CPU prior to the host CPU entering into the unavailable or overloaded state.

In some embodiments, the processor unit or logic circuit are implemented in a packet classification engine, a packet-inspection engine, deep-packet inspection engine, an embedded micro-controller in Data-plane, and/or ACL TCAMs located within a component of the data-plane.

In some embodiments, the processor unit or logic circuit executes a plurality of filters for state-transitions for a set of protocols.

In some embodiments, the plurality of filters includes a first filter configured to identify a LACP PDU (e.g., LACP control PDU) indicating a protocol state or resource state change of the logical channel, or one or more links within the channel.

In some embodiments, the plurality of filters includes a second filter configured to identify a BPDU indicating a Spanning Tree Protocol (e.g., MSTP, RSTP) topology-change notification (TCN) message.

In some embodiments, the plurality of filters includes a third filter configured to identify a GIR (graceful insertion and removal) operation of a peer network device (e.g., LLDP/CDP DPU, and/or GIR associated message in BGP, OSPF, RIP, EIGRP, and ISIS) (e.g., for load balancing or load sharing configurations).

In some embodiments, the host CPU is configured to pre-compute a filter to monitor for a specific protocol or resource state transition in a received packet during the unavailable state of the host CPU.

In some embodiments, the host CPU is configured to pre-compute updated data-plane entries to redistribute traffic to update the data-plane when the filter is matched.

In some embodiments, the processor unit or logic circuit is configured to monitor for a specified protocol state transition in a received control packet; and update the data-plane with pre-computed data-plane entries when specified protocol state transition is detected.

In some embodiments, the processor unit or logic circuit is configured to identify a received LACP PDU (e.g., LACP control PDU) indicating a down-channel link of a peer network device (e.g., event flag at address 1 of the actor-state field); and update the data-plane that a link aggregation channel associated with peer network device is down (e.g., by writing a state value to an address in the data-plane associated with the peer network device).

In some embodiments, the processor unit or logic circuit is configured to identify a received LACP PDU (e.g., LACP control PDU) indicating a state change of the logical channel, or one or more links within the channel; and update the data-plane of a disabled-state of a failed-port associated with the peer network device based on pre-computed hash of a modified local ether-channel to redistribute traffic on other members links based on a set of active links.

In some embodiments, the processor unit or logic circuit is configured to identify a received BPDU indicating a Spanning Tree Protocol (e.g., MSTP, RSTP) topology-change notification (TCN) message; and update the data-plane to move a port that received the TCN message to a blocking state.

In another aspect, a method is disclosed comprising the steps of performing, by a host CPU, control-plane operations that manage and maintain a plurality of data-plane-associated tables (e.g., L2 MAC table; MAC learning tables; L3 tables; RIB, FIB, etc.) of a switch-fabric of the network device; computing, by the host CPU, a plurality of filters to identify protocol state and/or resource state transitions associated with the control plane operations; transmitting, by a host CPU, to a processor unit or logic circuit (i.e., a non-host CPU component, e.g., logic circuits of NPU, RP, ASIC, switching-FPGA, or a core located therein, remote device), the plurality of computed filters; receiving, by the processor unit or logic circuit, the plurality of transmitted filters; tracking, via the plurality of plurality of received filters, implemented in a data plane component or a secondary processing unit, protocol state and/or resource state transitions of the control-plane (e.g., during the unavailable, overloaded state of the control-plane or as a normal course of operation in parallel to the host CPU), wherein the tracked protocol state and/or resource state transitions tracked by the plurality of received filters are used to update associated data plane resources.

In another aspect, a non-transitory computer readable medium is disclosed having instructions stored thereon, wherein execution of the instructions by a first processor comprising a processor unit/logic circuit to receive, from a data-plane interface, a plurality of filters to identify protocol state and/or resource state transitions associated with control plane operations, wherein the plurality of filters has been pre-computed by a host CPU or external CPU configured to perform control-plane operations that manage and maintain a plurality of data-plane-associated tables (e.g., L2 MAC table; MAC learning tables; L3 tables; RIB, FIB, etc.) of a switch-fabric of the network device; and track, via the plurality of received filters, implemented in a data plane component or a secondary processing unit, protocol state and/or resource state transitions of the control-plane (e.g., during the unavailable, overloaded state of the control-plane or as a normal course of operation in parallel to the host CPU), wherein the plurality of data-plane associated tables of the data plane are updated by the host CPU or the processor unit or logic circuit based on the tracked protocol state and/or resources.

Example System

FIG. 1A is a diagram of an examplary network device 100 (shown as 100a) configured with a protocol state transition and/or resource state transition tracking module 200 (see, e.g., FIGS. 2A, 2B, 2C) (also referred to as a protocol state machine transition tracker and a resource state machine transition tracker, respectively) in accordance with an illustrative embodiment. The protocol state transition and/or resource state transition tracking module 200 is configured to monitor for changes in protocol states represented in routing and/or forwarding tables of the data-plane and/or changes in hardware resource states of the network device.

In FIG. 1A, the network device 100a is configured as a network switch and is shown comprising a plurality of ports 102 coupled to forwarding engine implemented in a route or network processor 104 via a bus structure 106 (shown as "switch fabric" 106). Route or network processors 104 can be used to execute routing protocols, e.g., by maintaining routing information and forwarding table(s). The route or network processor 104 may have access to fast memory 108 (such as ternary content-addressable memory (TCAM), CAM, SRAM, buffers, etc.) and local memory 110 (e.g., dynamic random-access memory (DRAM), SRAM)).

The route or network processor 104 may communicate with a host processor 105 (also referred to herein as a host CPU and shown as "Host Processor(s)" 105). As discussed above, a host CPU generally refers to a core of a microprocessor or microcontroller, e.g., having RISC or CISC architecture, that is configured to execute general computer instructions (i.e., applications, middleware) within the framework of an operating system. Here, computer instructions generally refer to general instructions, preferably, that are prepared not to be specifically tied to a particular computer architecture. The host CPU 105 has a bus interconnect 132 (e.g., PCI or PCIe (PCI-express) bus) that serves as a data plane interface to the route or network processors 104 and/or other components of the data-plane. PCIe can refer to PCI-X, PCI-express 16×, PCI-express 1×, and the like. Examples of other bus interconnect is the AGP (accelerated graphics port) bus. In some embodiments, the host CPU 105 and route/network processors 104 are co-located on a same supervisory card 114. In yet other embodiments, the host processor 105 is used as a substitute for, or integrated with, the route or network processor 104 or components thereof, e.g., in a network-on-a-chip (NoC). The bus interconnect 132 provides connectivity between the host CPU 105 and the data plane 136.

In FIG. 1A, the route/network processors 104 is shown to connect to inline cards 112 (shown as 112a, 112b, 112c, and 112d) through the switch fabric 106. Switch fabric may be embodied as a cross-bar switch configured to interconnect a plurality of serial channel port interfaces to establish point-to-point wire connections for switching frames among the line cards of the switch.

In FIG. 1A, in some embodiments, the ports 102 are shown located on a plurality of in-line cards 112 (shown as 112a, 112b, 112c, and 112d) and the forwarding engine (i.e., route/network processor 104) is located on a supervisor card 114. Each in-line card 112 may include one or more ASIC(s) 116, memory and memory-like resources 118 (e.g., CAM, registers, buffers, and driver 120) to route a frame received at one of its port to another port or to route the frame to the switch fabric 106 to other ports in the network switch. Other configurations and implementations may be implemented. An "ASIC" as used herein may refer to a customized application specific integrated circuit as well as configurable integrated circuit such as field-programmable gate array (FPGA) and complex programmable logic device (CPLD).

Broadly stated, when a frame (also referred to as a packet) is received at a port 102 at the line card, the frame is driven over an internal bus of the line card 112 based on forwarding decision rendered by the ASIC 116 (or local processor) located in the line card or is driven over the switch fabric 106 to other ports based on forwarding decision rendered by the forwarding engine. Such frames are processed by the data plane (also referred to as the forwarding plane, among other) of the network device. In FIG. 1A, the data-plane 136 is shown as any component and associated resources involved in the forwarding and routing of user traffic. The data-plane (e.g., forwarding engine) renders the forwarding decision by accessing a forwarding or routing table to look-up a destination MAC address of the frame. Frames associate with the control plane (e.g., those associated layer-2 and/or layer-3 control protocol such as Spanning Tree Protocol (STP), Open Shortest Path First (OSPF), Multiprotocol Label Switching (MPLS), Internet Group Management Protocol (IGMP), Intermediate System to Intermediate System (IS-IS), Border Gateway Protocol (BGP), PIM, Enhanced Interior Gateway Routing Protocol (EIGRP), Routing Information Protocol (RIP), virtual LAN (VLAN), Virtual Extensible LAN (VxLAN), etc.) and management plane (e.g., associated with telnet, command line interface (CLI), file transfer protocol (FTP), trivial file transfer protocol (TFTP), syslog, secure shell (SSH), simple network management protocol (SNMP), Hypertext Transfer Protocol (HTTP), HTTP Secure (HTTPS), access control lists (ACL), etc.) may also be received at the ports but are generally routed to the ASICs or to the route or network processor 104 to update control and management operation of the network device 100 (e.g., 100a, 100b, etc.).

The network device 100 (e.g., 100a) may include, as shown in FIG. 1A, additional cards 122 comprising processors 124 and memory 126 to perform other control or supervisory operations of the network device 100 (e.g., 100a). In some embodiments, the additional cards 122 (as well as in the supervisory card 114) may be implemented in general-purpose or special purpose computing devices environments, virtual network environment, or configurations. Components on the additional cards 122 may be connected to other components via the bus interconnect 132 or the switched fabric. The bus interconnect 132 also may allow the host CPU 105 to connect to the data-plane 136 via host CPU driver 134.

Computer-executable instructions, such as program modules, being executed by a computing device (e.g., via the host CPU) may be used. Generally, program modules include routines, programs, objects, components, data structures, etc. that perform particular tasks or implement particular abstract data types. Computer-executable instructions may execute the Protocol and/or Resource State Transition Tracker functionality to be discussed below.

Distributed computing environments may be used where tasks are performed by remote processing devices that are linked through a communications network or other data transmission medium. In a distributed computing environment, program modules and other data may be located in both local and remote computer storage media including memory storage devices.

Computing device typically includes a variety of computer readable media. Computer readable media can be any available media that can be accessed by the device and includes both volatile and non-volatile media, removable and non-removable media. Computer readable media may be used to store executable instructions for Protocol and/or Resource State Transition Tracker functionality to be discussed below. Computer storage media include volatile and non-volatile, and removable and non-removable media implemented in any method or technology for storage of information such as computer readable instructions, data structures, program modules or other data. Memory, removable storage, and non-removable storage are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by computing device. Any such computer storage media may be part of computing device. Computer-executable instructions and computer storage media are well known in the art and are not discussed at length here.

Computing device may contain communication connection(s) that allow the device to communicate with other devices. Computing device may also have input device(s) such as a keyboard, mouse, pen, voice input device, touch input device, etc. Output device(s) such as a display, speakers, printer, etc. may also be included. All these devices are well known in the art and are not discussed at length here.

Figure 1B:
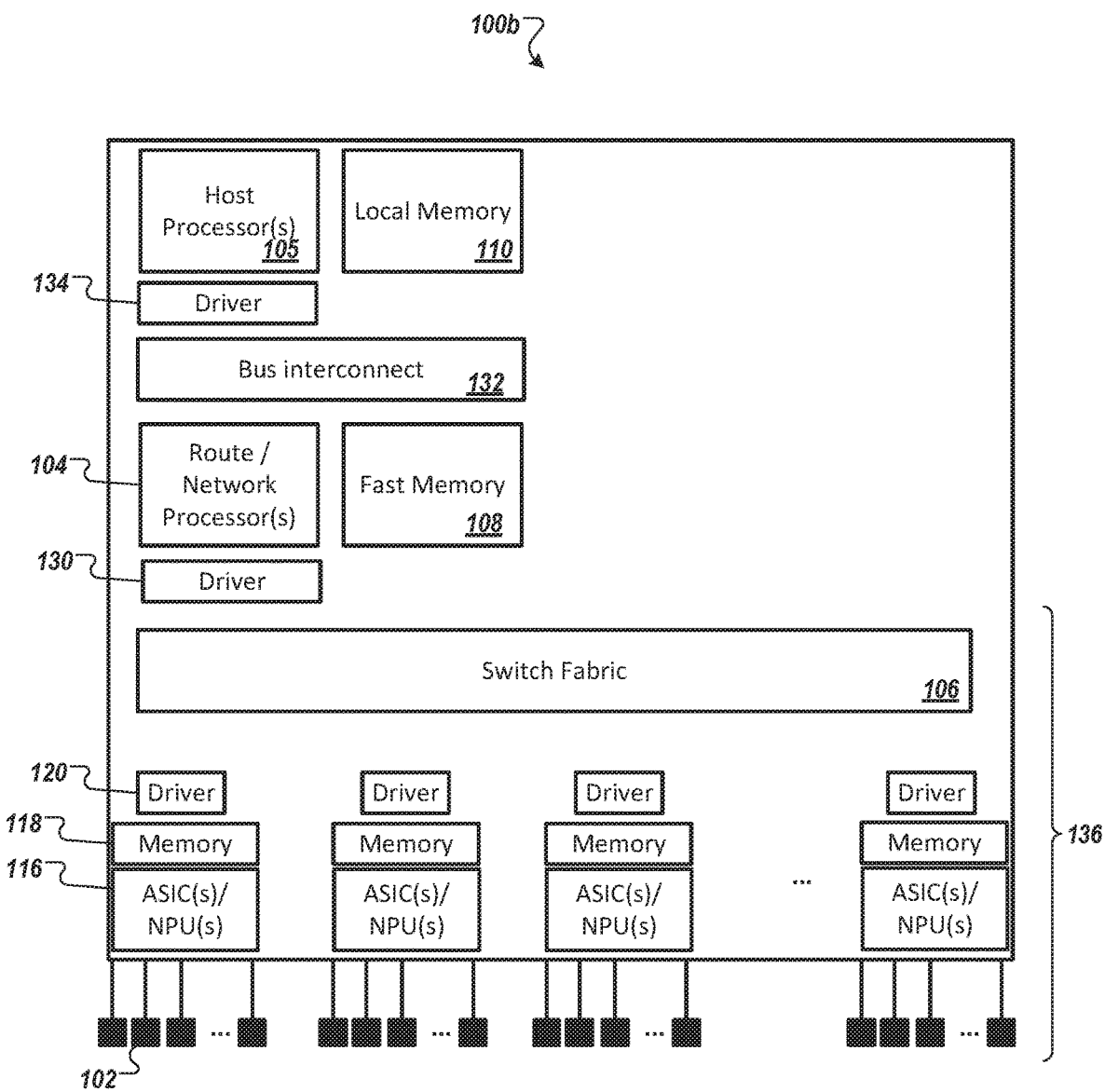
FIG. 1B is a diagram of another exemplary network device configured with a protocol state transition and/or resource state transition tracking module in accordance with an illustrative embodiment.

The instant protocol state transition and/or resource state transition tracking module may be deployed in various network device. FIG. 1B is a diagram of another network device 100 (shown as 100b) configured with a protocol state transition and/or resource state transition tracking module (e.g., 200) in accordance with an illustrative embodiment. In FIG. 1B, the network device 100b is configured as a fixed-configuration switch. As shown, the switching components (e.g., 116, 118, and 120), supporting data-plane components (e.g., 104, 108, 130) and control-plane components (e.g., 105, 110, 134) are integrated into one or more boards. Because of the limited redundancy of supporting data-plane components, implementations of the protocol state transition and/or resource state transition tracking module in such systems (e.g., 100b) can be particularly beneficial to overall system uptime.

Example Protocol State Transition and/or Resource State Transition Tracker

Figure 2A:
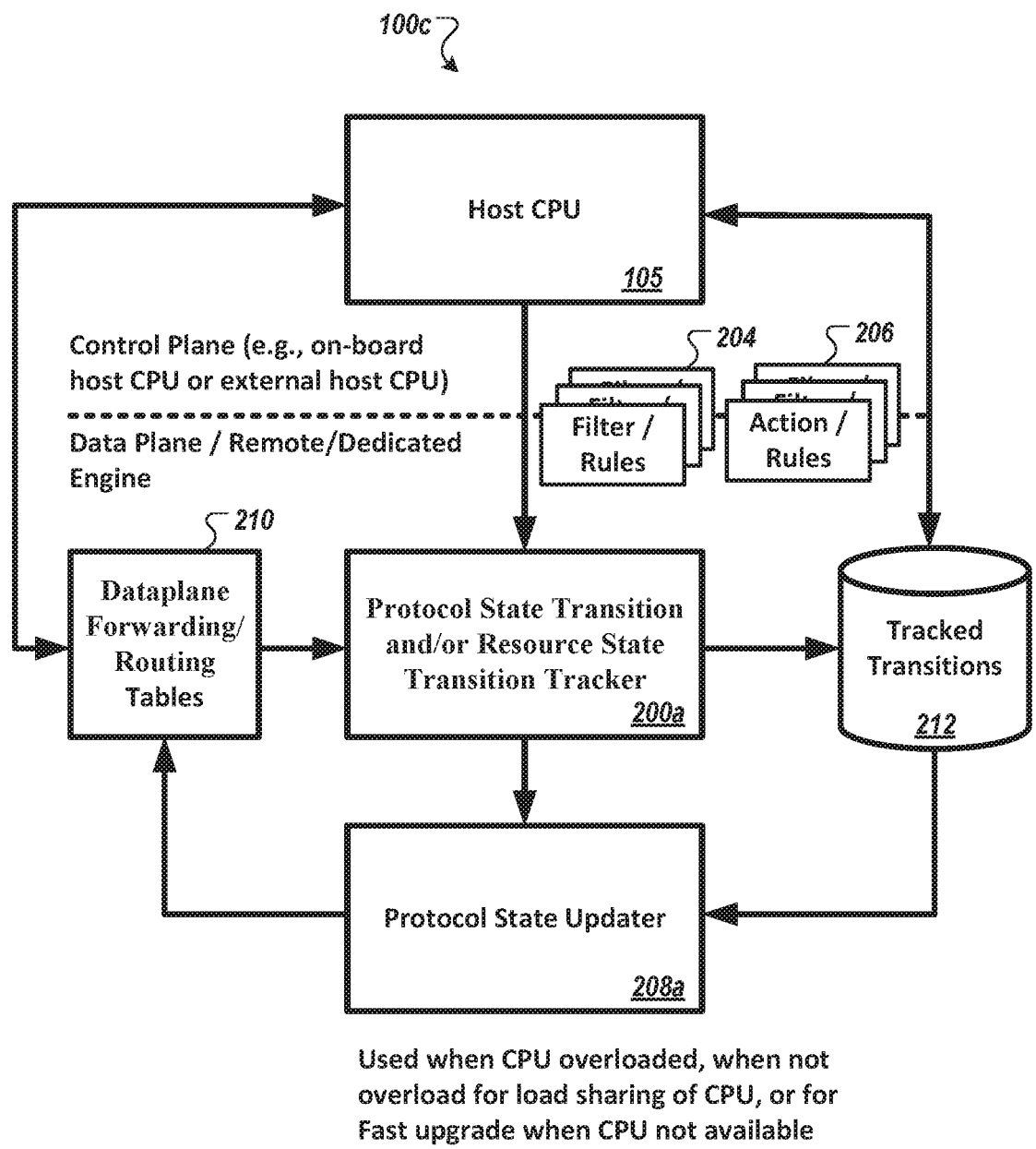
FIG. 2A shows an exemplary network device configured with a protocol state transition and/or resource state transition tracker module in accordance with an illustrative embodiment.

FIG. 2A shows an exemplary network device 100 (shown as 100c) configured with a protocol state transition and/or resource state transition tracker module 200 (shown as 200a) in accordance with an illustrative embodiment. A module may include a software application, firmware, middleware, preconfigured logic function of configurable hardware (IP), or a combination thereof. The protocol state transition and/or resource state transition tracker module 200 may be implemented in a processor unit or logic circuit (PULC) that is a non-host CPU component, including, for example, logic circuits or processing units of a network processing unit (NPU), routing processor (RP), ASIC, switching-FPGA, or processing core(s) located therein, as well as remote devices (e.g., OpenFlow controller).

As shown in FIG. 2A, the control-plane (shown as host processor 105) installs filtering rules 204 (shown as "Filter/Rules" 204) in the protocol state transition and/or resource state transition tracker module 200 (shown as 200a) which, when operating in concert with the filtering rules 204, is configured to match for certain control-plane state-transition messages (see, e.g., FIGS. 6, 7, 8) for a set of protocols as defined in the filters 204. A filtering rule 204 has one or more corresponding action instructions or sequences 206 (shown as "Action/Rules" 206) that may be executed upon a match of filter specified in the filtering rule 204. The action instructions/sequences 206 may be installed in the host CPU, in data plane components, or in a secondary processing unit, to perform corresponding actions to update the data plane upon a filter being matched. In some embodiments, the filtering rules 204 and/or corresponding action instructions/sequences 206 are pre-computed by the host processor 105. In some embodiments, the filtering rules 204 are pre-computed by the host processor 105, and the corresponding action instructions/sequences 206 are subsequently computed when a given filtering rule is matched. In other embodiments, the filtering rules 204 and/or corresponding action instructions/sequences are computed by a remote controller (e.g., OpenFlow controller (not shown; see FIG. 3)) and are transmitted to the network device 100 (e.g., 100a, 100b, 100c, etc.).

Specifically, in some embodiments, the protocol state transition and/or resource state transition tracker module 200 (e.g., 200a, 200b, 200c) is configured to scan through a set of fields in a protocol control-plane message, e.g., for updates to the protocol state. The protocol state transition aspect of the tracker module 200 (e.g., 200a, 200b, 200c), in some embodiments, is configured to scan for specific values in the fields and flag when a match for a specific value in the field of interest is found. The filtering logic may be implemented solely in, or through a variety of, hardware blocks, for example, in ACL TCAM, packet classification engine, deep packet inspection engine, packet parser, among the like.

For example, for certain hardware resource state transitions where a protocol packet is received, filtering logic may be implemented solely in, or through a variety of, hardware blocks, for example, in ACL TCAM, packet classification engine, deep packet inspection engine, packet parser, and the like. However, for certain hardware resource state transitions that does not have an associated packet/frames, an embedded micro-controller or other logic circuit may be used to implement a portion of the protocol state transition and/or resource state transition tracker module 200 (e.g., 200a, 200b, 200c) to track such hardware resource state transitions.

In addition to specific protocol messages, the protocol state transition and/or resource state transition tracker module 200, in some embodiments, is also configured to track other events that may impact the forwarding topology (e.g., link down). In some embodiments, the resource state transition tracker aspect of the module 200, when operating in concert with the filtering rules, is configured to match for certain resource state-transition signals or messages (not shown; see FIG. 10) for a set of hardware resource as defined in the filters.

Indeed, once filtering rules 204 are configured in the protocol state transition and/or resource state transition tracker module 200 (e.g. 200a, 200b, 200c), based on the rules, the module 200 can track/flag events and/or state transitions (e.g., protocol state transition or resource state transition) that could impact the forwarding topology while the data-plane components are running headless (e.g., without the host CPU 105). The tracked state (once identified and/or matched) are used to update the data-plane (such as shutting down an adjacency, blocking a port, update forwarding/routing tables, etc.) to minimize the negative impact on the network and, in some embodiments, allow the network device to be kept running while the host CPU is unavailable. More elaborate control-plane actions, such as renegotiation, re-convergence etc. may be subsequently performed after the control-plane is fully or partially functional. In some embodiments, the tracked state (once identified and/or matched) are used to update the data-plane while the control plane (e.g., host CPU) is unavailable (or overloaded), e.g., by protocol state transition and/or resource state transition tracker module 200 or a module (e.g., an update module or a secondary processing unit) operating in conjunction with the protocol state transition and/or resource state transition tracker module 200. In other embodiments, the tracked state are used to update to the data plane by the control plane following the transition of the control plane (e.g., in a primary or secondary tread of the host CPU) from the unavailable (or overloaded) state to an available state.

The protocol state transition and/or resource state transition tracking module 200 (e.g., 200a, 200b, 200c) may be implemented, in part, or whole, in data plane associated components or external device components that can be configured and reconfigured to implement a filter (e.g., that can match a set of packet-header fields to the desired values (rules)). The data plane associated components or external device components may be entirely hardware-based (e.g., reconfigurable logic and/or tables), entirety software-based, or a combination of both hardware-based and software-based filtering. Examples of data plane associated components or external device components include, but are not limited to, hardware or software modules that are configured, in whole, or in part, as a packet classification engine, a deep packet inspection engine, a packet parser, ACL TCAMs, among others. In some embodiments, the protocol state transition and/or resource state transition tracking operations are implemented in multiple modules.

The protocol state transition and/or resource state transition tracking module 200 (e.g., 200a, 200b, 200c) preferably is configured to operate independently of the host CPU. In some embodiments, the protocol state transition and/or resource state transition tracking module is configured to execute filters when the host CPU is not available or is overloaded. In other embodiments, for example, where the protocol state transition and/or resource state transition tracking module is used for load sharing operation, the protocol state transition and/or resource state transition tracking module is configured as a co-processor or secondary processing unit or the like (e.g., in the control-plane or in remote components) that operate in conjunction with the host CPU.

As shown in FIG. 2A, in some embodiments, the network device 100 (e.g., 100c) is configured to operate with a protocol state updater 208 (shown as 208a) that performs, using the actions instructions/sequences 206, the update to the data-plane (shown as data-plane forwarding/routing tables 210) while the control plane (e.g., host CPU 105) is unavailable. The protocol state updater 208 (e.g., 208a) may be a part of the protocol state transition and/or resource state transition tracking module 200. In other embodiments, the protocol state updater 208 (e.g., 208a) is implemented in other components of the data plane. The protocol state updater 208 (e.g., 208a) may retrieve tracked state transitions from a table or database 212 (shown as "Tracked transitions" 212a)) maintained and/or populated by the protocol state transition and/or resource state transition tracking module 200 (e.g., 200a). In other embodiments, the protocol state updater 208 (e.g., 208a) receives tracked state transitions, associated with a matched filter 204, from the protocol state transition and/or resource state transition tracker module 200.

In some embodiments, the protocol state transition and/or resource state transition tracking module 200 (e.g., 200a, 200b, 200c) is configured to execute filtering rules for protocol state transitions and/or filtering rules for resource state transitions and to update a hit counter upon each match. In some embodiments, the protocol state transition and/or resource state transition tracking module 200 (e.g., 200a, 200b, 200c) is configured to update a hit flag (rather than a counter) that indicates a match of a given filter. The hit counter or hit flag has an associated address in the table or database 212 to which the protocol state updater 208 (e.g., 208a, 208c), for example, may scan to take actions. In some embodiments, the hit flag or hit counter for a set of filters may be assigned a set of addresses to which the filter (e.g., a TCAM and associated logic) can update. To this end, the protocol state updater 208 (e.g., 208a, 208c) may scan a set of values in the table or database 212 to identify if there are updates to which the updated 208 (e.g., 208a, 208c) can act. Of course, other data formats and information may be stored as, or in addition, to a hit counter or hit flag. For example, in some embodiments, a hit counter or hit flag may be updated along with addresses for corresponding action instructions or sequence. In some embodiments, the hit counter or hit flag may be updated along priority information associated with a given filter.

In other embodiments, the protocol state transition and/or resource state transition tracking module 200 is configured to execute filtering rules for protocol state transitions and/or filtering rules for resource state transitions and send a match event to a queue of the protocol state updater 208. The protocol state updater 208 (e.g., 208a, 208c) may then take associated action to a given matched filter based on the match event information in its queue.

Pre-computed filters (e.g. 204) may be calculated and stored in volatile or non-volatile memory, e.g., of the data plane components. Corresponding action instructions/sequences (e.g., 206) may be stored in non-volatile memory, e.g., in embodiments in which a thread in the host CPU is used to perform an update to the data plane resource. In some embodiments, the action instructions/sequences (e.g., 206) may be stored in volatile memory where the instructions (e.g., 206) are executed on data plane components or secondary processing units.

Figure 2B:
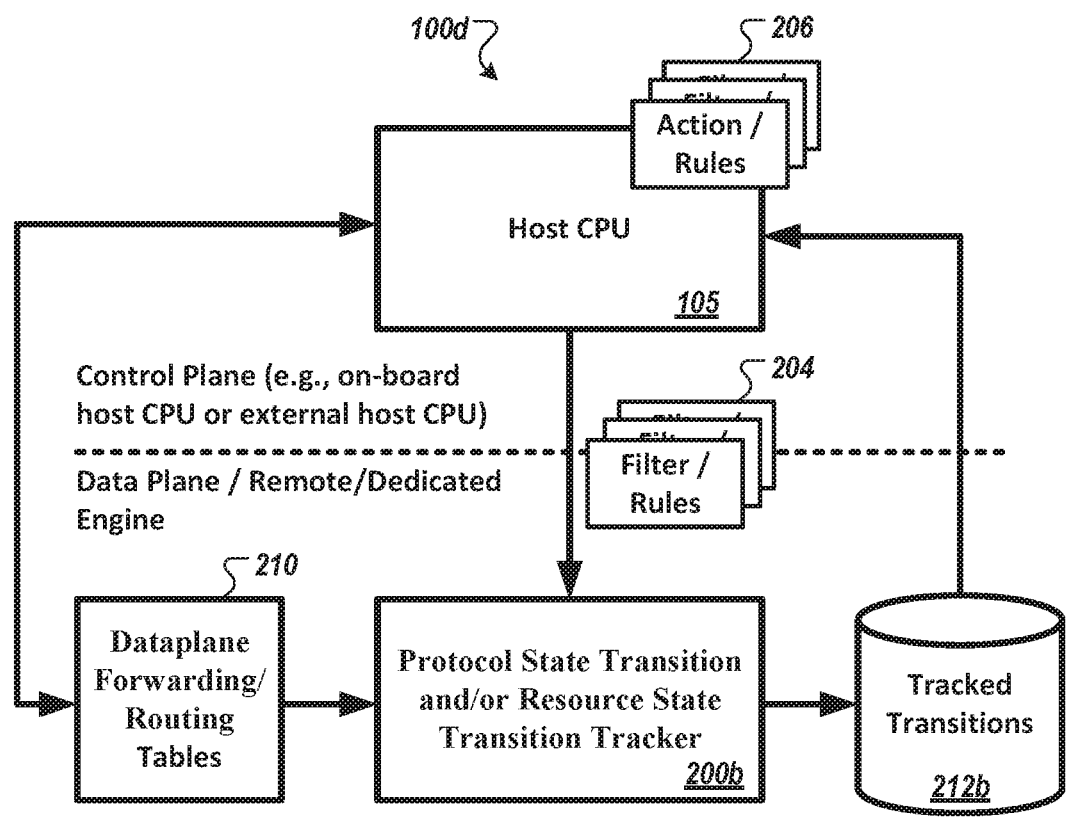
FIG. 2B shows an exemplary network device configured with a protocol state transition and/or resource state transition tracker module in accordance with another illustrative embodiment.

FIG. 2B shows an exemplary network device 100 (shown as 100d) configured with a protocol state transition and/or resource state transition tracker module 200 (shown as 200b) in accordance with another illustrative embodiment. In FIG. 2B, filters 204 for protocol transition states and/or for resource transition states are computed, e.g., by the host CPU 105, and installed into the protocol state transition and/or resource state transition tracker module 200 (e.g., 200b), e.g., as discussed in relation to FIG. 2A, and the protocol state transition and/or resource state transition tracker module 200b is configured execute the filter to track/flag events and/or state transitions (e.g., protocol state transition or resource state transition) that could impact the forwarding topology while the data-plane components are running headless (e.g., without the host CPU 105) and store the tracked transitions. Corresponding action instructions/ sequences 206 for a given filter 204 may be computed, e.g., by the host CPU 105, concurrently with the computing of the filters 204.

In FIG. 2B, the protocol state transition and/or resource state transition tracker module 200 (e.g., 200b) is configured to match a state transition (e.g., match values in sets of packet-header fields to pre-defined filter rules) and stored any determined matches in a table or database 212 (shown as tracked transitions 212b). In some embodiments, the table or database 212 (e.g., 212b) is a part of the component executing the protocol state transition and/or resource state transition tracker module 200. The table or database 212 (e.g., 212b) may then be accessed, e.g., by the host CPU 105 once it is available, to perform an update of the state transition to the data-plane forwarding/routing tables 210 using an appropriate action instruction/sequence 206 corresponding to a given matched filter.

Figure 2C:
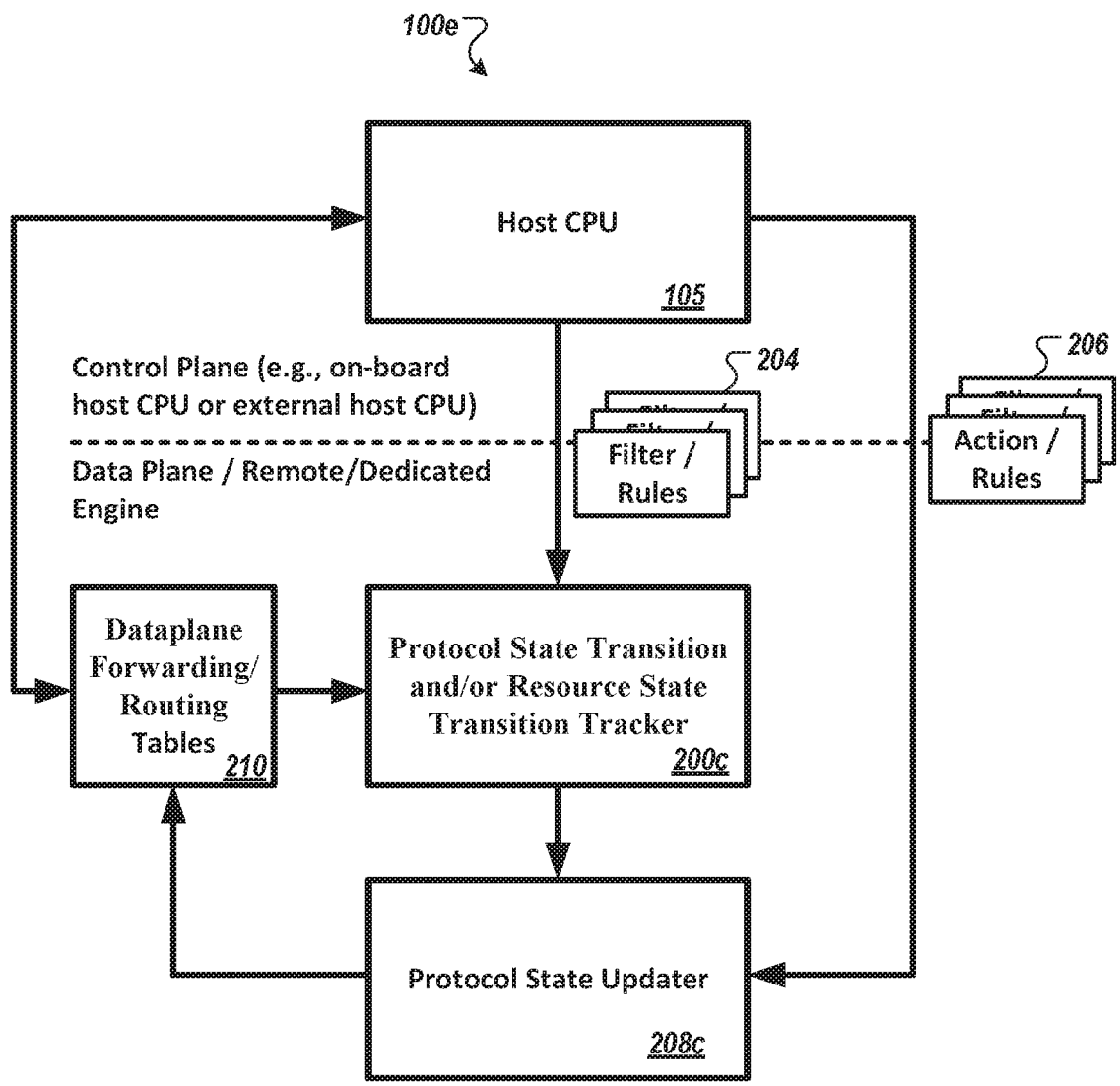
FIG. 2C shows an exemplary network device configured with a protocol state transition and/or resource state transition tracker module in accordance with another illustrative embodiment.

FIG. 2C shows an exemplary network device 100 (shown as 100e) configured with a protocol state transition and/or resource state transition tracker module 200 (shown as 200c) in accordance with another illustrative embodiment. In FIG. 2C, filters 204 for protocol transition states and/or for resource transition states are computed, e.g., by the host CPU 105, and installed into the protocol state transition and/or resource state transition tracker module (e.g., 200c), e.g., as discussed in relation to FIGS. 2A and 2B, and the protocol state transition and/or resource state transition tracker module (e.g., 200c) is configured execute the filter to track/flag events and/or state transitions (e.g., protocol state transition or resource state transition) that could impact the forwarding topology while the data-plane components are running headless (e.g., without the host CPU 105) and store the tracked transitions. Corresponding action instructions/ sequences 206 for a given filter 204 may be computed, e.g., by the host CPU 105, concurrently with the computing of the filter and installed into the protocol state updater (e.g., 208c). Then, the protocol state transition and/or resource state transition tracker module (e.g., 200c) is configured to match a state transition (e.g., match values in sets of packet-header fields to pre-defined filter rules) and to push a matched/determined state transition (as a signal or message) to the protocol state updater 208 (shown as 208c). In some embodiments, the matched/determined state transition is pushed into a queue of the protocol state updater 208 (e.g., 208c). The matched/determined state transition includes, at least, a filter identifier corresponding to a filter to which corresponding action instructions can be identified and retrieved. The protocol state updater 208 (e.g., 208c) then performs an update of the state transition to the data-plane forwarding/routing tables 210 according to the action instructions/sequences 206 for a given matched filter.

In some embodiments, the protocol state updater 208 (e.g., 208c) performs the update while the host CPU 105 and/or control plane is unavailable. In other embodiments, the protocol state updater 208 (e.g., 208c) is configured to perform the update in parallel to control plane operation executing on the host CPU 105.

Figure 3:
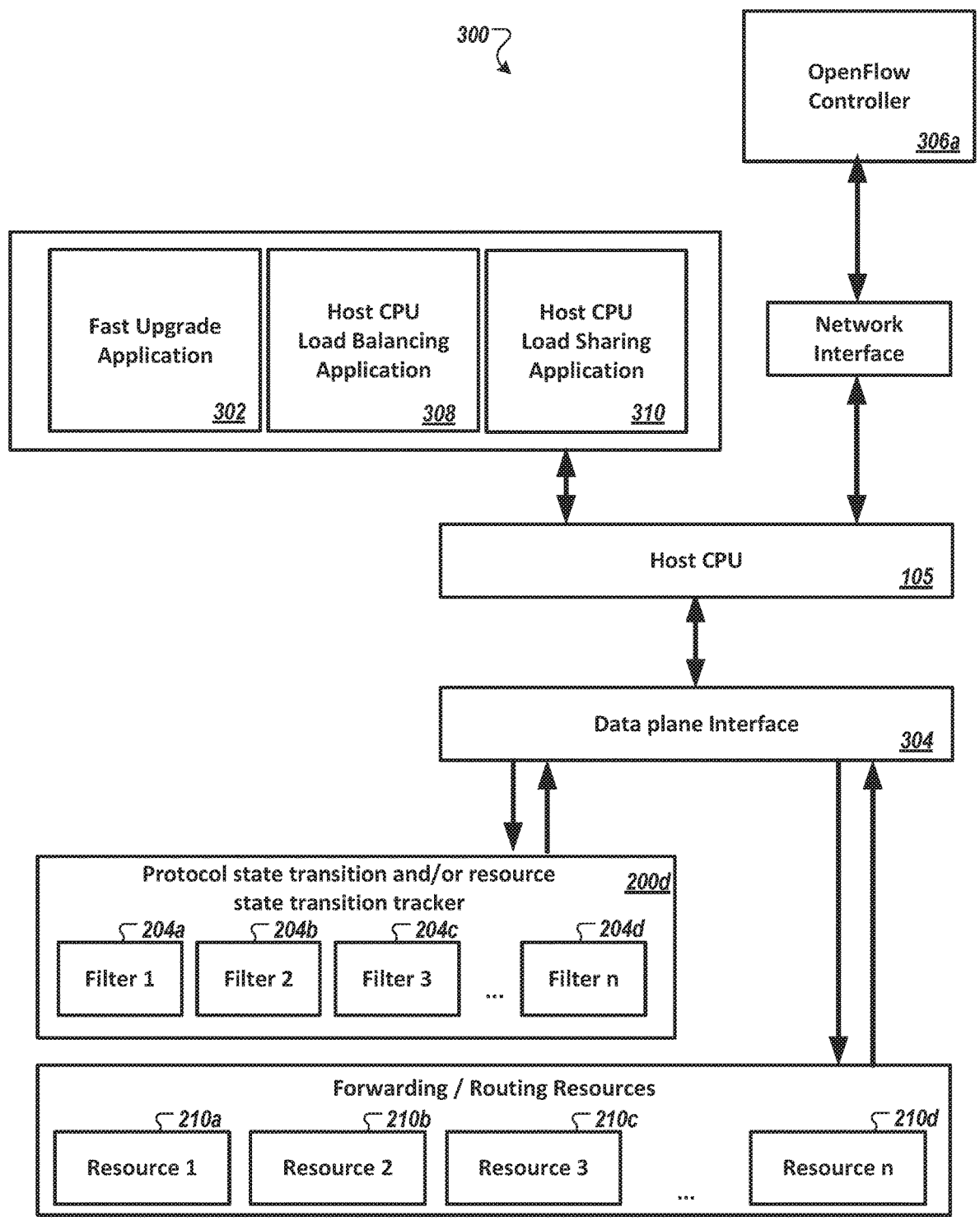
FIG. 3 shows an exemplary network device configured with the protocol state transition and/or resource state transition tracker module of FIG. 2A, 2B, or 2C in accordance with an illustrative embodiment.

Fast Upgrade Application Using Example Protocol State Transition and/or Resource State Transition Tracker FIG. 3 shows an examplary network device 100 (shown as 300) configured with the protocol state transition and/or resource state transition tracker module 200 of FIG. 2A, 2B, or 2C in accordance with an illustrative embodiment.

In FIG. 3, the network device 300 comprises a protocol state transition and/or resource state transition tracker module 200 (shown as 200d) that is configured to operate with fast upgrade application 302 to facilitate the tracking of protocol state or resource state transitions when the host CPU is unavailable for fast upgrade operation (also referred to herein as a Fast Software Upgrade (FSU) operation). One or more instances of the protocol state transition and/or resource state transition tracker module 200d may be implemented or instantiated.

During software upgrade operations, the control plane may be disabled (for the upgrade) and the data-plane may be allowed to run headless. Since the upgrade process may take a few minutes (~5 minutes) to perform, the data-plane may be running with a stale forwarding topology in which protocol and resource state changes are not acted upon during the duration of the upgrade. Depending on the condition changes, network and/or security issues may arise (e.g. spanning tree loop leading to flooded traffic storm) and thus software upgrade operations are often performed with the entire network device coming off-line. In some embodiments, e.g., where the network device is used for control and automation and/or where the network device does not have redundancy (e.g., standby modules), this may create massive disruptions to a given real-time control operation.

Conventionally, switching and routing systems often implement software upgrade operation by implementing some form of redundancy, e.g., using backup modules. For example, route processor may be switched to an active role, while previously active modules (e.g., host CPU) go through an upgrade and vice-versa. This topology is often referred to as In-Service Software Upgrade (ISSU). For non-redundant, standalone switching systems that lack such backup modules (often deployed in access application) (e.g., as shown in FIG. 1B as well as in FIG. 1A where standby modules are not installed), the process of software upgrade may be intrusive where there is only one host CPU in the system.

The instant protocol state transition and/or resource state transition tracker module 200 (e.g., 200a-200e) facilitates the tracking of condition changes that can prevent the bringing down of the system during the duration of upgrade. Indeed, the protocol state transition and/or resource state transition tracker module 200 (e.g., 200a-200e) may be used in combination with fast software upgrade (FSU) application to provide continuous data-plane update services, or the tracking of protocol state changes or hardware resource changes when the host CPU is unavailable, to minimize the impact on the data forwarding services of the network device. In some embodiments, the instant protocol state transition and/or resource state transition tracker module 200 (e.g., 200a-200e) may provide near continuous operation with minimal disruption (e.g., less than a second, often in the order of milliseconds, disruption) to network devices to improve the overall uptime of the network device. The instant network may do so by decoupling the data-plane and the control-plane and, in essence, letting the data-plane continue to run independently of the host CPU/control-plane (referred to herein and often described as "headless"). During the headless operation, the data-plane generally runs with old forwarding state (e.g. MAC addresses, IP routes) information, but with updates tracked by the instant protocol state transition and/or resource state transition tracker module 200 (e.g., 200a-200e). In some embodiments, the host CPU (e.g., 105) may be brought down (i.e., disabled and/or made unavailable), reloaded, and upgraded with a new version of software upgrade.

Fast upgrade operations may operate in conjunction with graceful restart mechanisms (e.g., as described in IEFT RFC 5187) that address to reduce the impact of the software upgrade by informing its peers ahead of time. Graceful restart mechanisms may alleviate fast upgrade issues for layer 3 protocols and their corresponding state machine. In conjunction with the fast upgrade operations, the network device can additionally address layer 2 updates that prevent, or reduce, forwarding of packets to incorrect destinations, creation of network loops, delayed network convergence in other systems, and/or security vulnerabilities.

In some embodiments, the network device (e.g., 100) is configured as a non-redundant, fixed configuration switching systems. In some embodiments, the network device (e.g., 100) is configured as a redundant, fixed configuration switching systems. In some embodiments, the network device (e.g., 100) is configured as a non-redundant, modular switching systems. In some embodiments, the network device (e.g., 100) is configured as a redundant, modular configuration switching systems. In other embodiment, the network device may be routers or other networking systems (e.g., having fixed or modular configurations and/or having redundant or non-redundant data-plane support components).

Figure 5A:
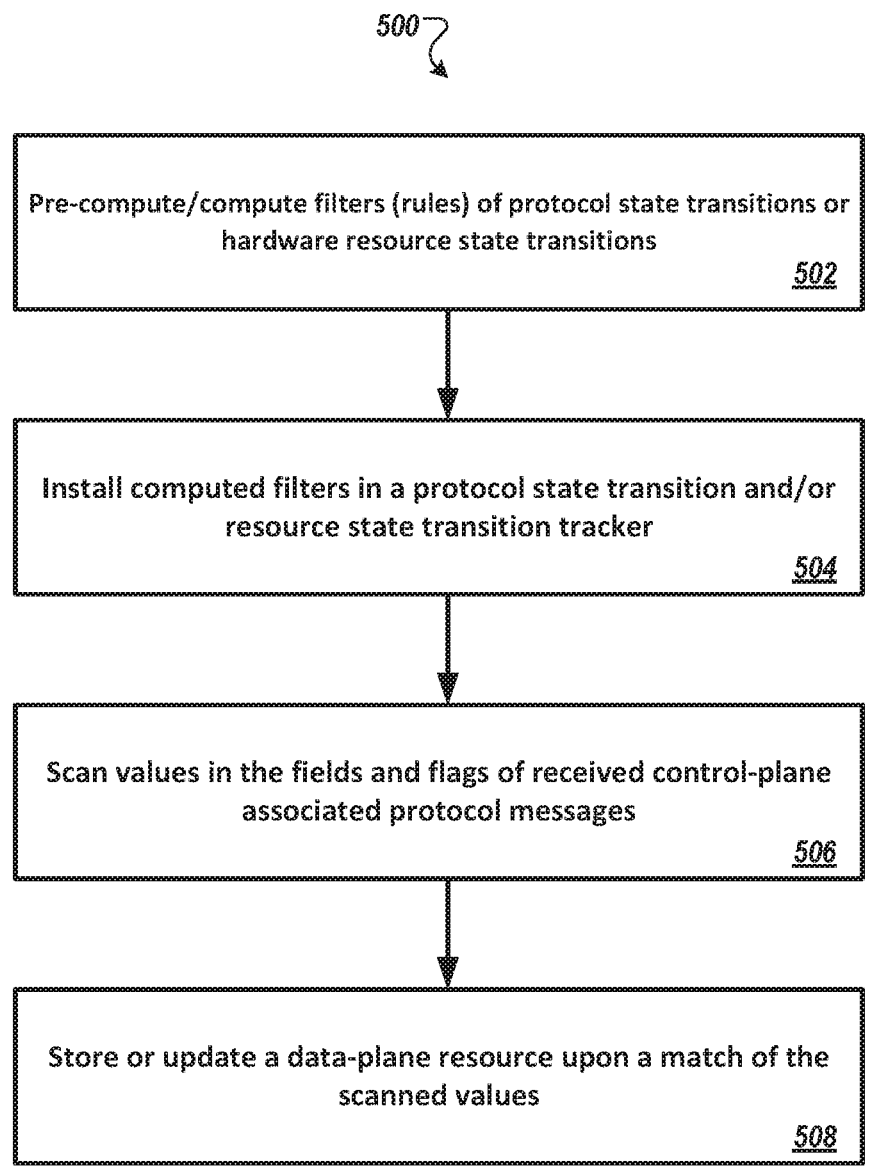
FIG. 5A shows an exemplary method of tracking protocol state and/or resource state transitions of the control-plane (e.g., during the unavailable, overloaded state of the control-plane, or as a normal course of operation in parallel to the host CPU) in accordance with an illustrative embodiment.

FIG. 5A shows an exemplary method of tracking protocol state and/or resource state transitions of the control-plane (e.g., during the unavailable, overloaded state of the control-plane, or as a normal course of operation in parallel to the host CPU) in accordance with an illustrative embodiment.

Figure 5B:
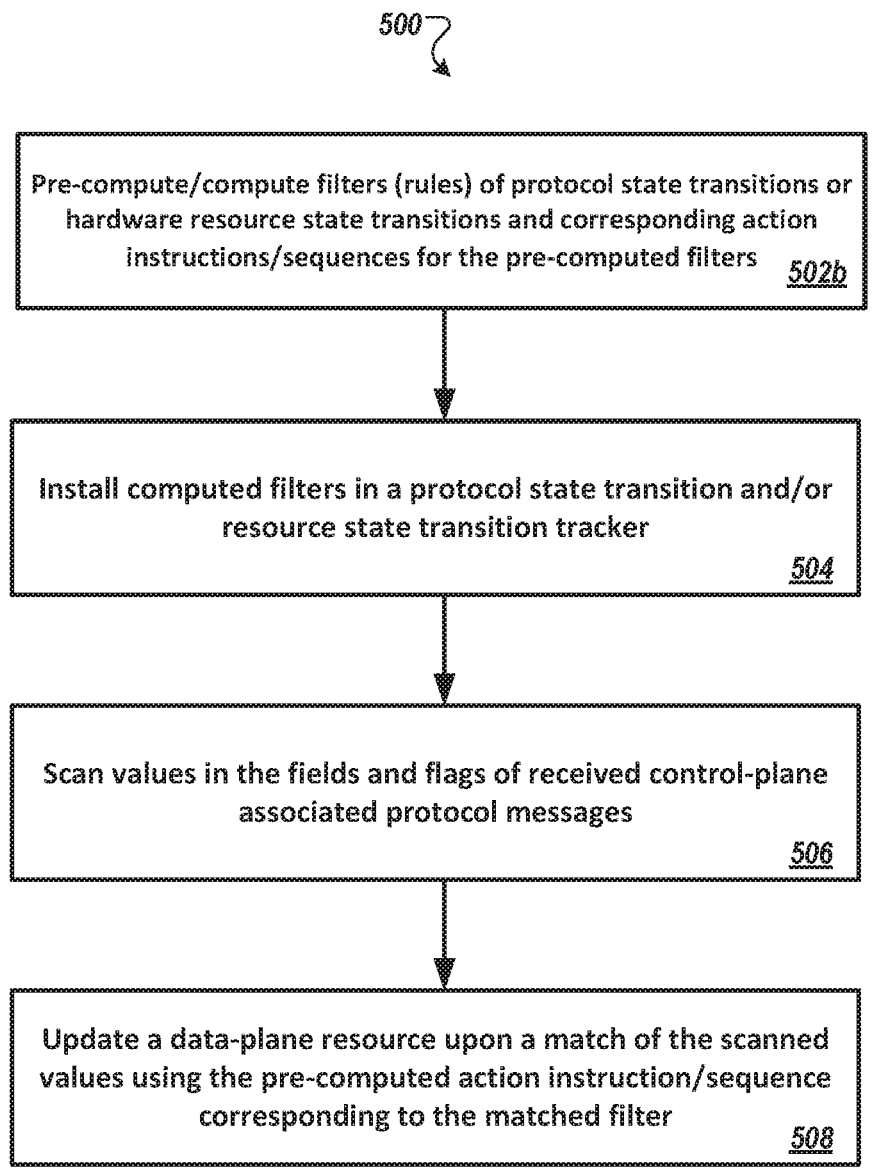
FIG. 5B shows an exemplary method of tracking protocol state and/or resource state transitions of the control-plane (e.g., during the unavailable, overloaded state of the control-plane, or as a normal course of operation in parallel to the host CPU) in accordance with another illustrative embodiment.

FIG. 5B shows an exemplary method of tracking protocol state and/or resource state transitions of the control-plane (e.g., during the unavailable, overloaded state of the control-plane, or as a normal course of operation in parallel to the host CPU) in accordance with another illustrative embodiment. Referring to FIG. 5A or 5B (and FIG. 3), when the software upgrade operation is initiated, the control-plane determines (step 502) a set of filtering rules and installs (step 504) filtering rules in the protocol state transition and/or resource state transition tracker module 200d, e.g., in the data-plane. In some embodiments, the filtering rules may be derived, or received, from a network interface that provides for communication with a remote controller 306 (shown as "OpenFlow Controller" 306a). In some embodiments, the control-plane determines (step 502b of FIG. 5B) a set of corresponding action instructions/sequences concurrently with the computation of the filtering rules. In other embodiments (e.g., FIG. 5B), the control-plane determines a corresponding action instructions/sequence once a filter has been installed and matched. The action instructions/sequences may be stored in software, e.g., in non-volatile memory for execution by the host CPU 105 or in data plane components, e.g., executing a protocol state updater (e.g., 208a, 208c).

The filters 204 (e.g., 204a-204d), in some embodiments, provide for the matching of state-transition messages for a set of protocols (e.g., those described herein). In some embodiments, for example, when a protocol's state update is communicated through a set of fields in that protocols' messages, the protocol state transition and/or resource state transition tracker module (e.g., 200d) is configured to look (step 506) for, e.g., scan, specific values in the fields and flags when a match is identified. That is, scanning values in fields and flags of received protocol messages may be automatically performed in the Packet-Inspection Engine or TCAM block.

In addition to specific protocol messages, the protocol state transition and/or resource state transition tracker module 200d may also track other events that may impact the forwarding topology (e.g., link down). The filtering logic may be implemented through a variety of hardware blocks (e.g., ACL TCAM). Any required resources are reserved at system startup.

Once the rules are configured in the protocol state transition and/or resource state transition tracker module 200d (e.g., in the data-plane), events that could impact the forwarding topology are flagged while the system (data-plane) is running headless. The tracked information is then used to perform the necessary updates (step 508) to the data-plane (such as shutting down an adjacency, blocking a port etc.) to minimize the negative impact on the network. More elaborate actions, such as renegotiation, re-convergence etc. may be performed after the control-plane is fully functional.

During the software upgrade process, the protocol state transition and/or resource state transition tracker module 200d may monitor (e.g., step 506) events that could impact the forwarding topology and, in some embodiments, apply control-plane associated correction and/or updates (e.g., step 508) as a result of such events. In some embodiments, per step 508, the protocol state transition and/or resource state transition tracker module 200d may perform staggered data-plane update that may be performed as simple processes running on the host CPU while the system is recovering (see, e.g., FIG. 12). In addition, the protocol state transition and/or resource state transition tracker module 200d may be implemented in available computation resource, e.g., in the data-plane to facilitate more frequent updates. Example of available resources include microcontrollers in the data-plane itself, e.g., microprocessor cores on certain ASICs in a switch gear hardware.

As shown in FIG. 3, the protocol state transition and/or resource state transition tracker module (e.g., 200d) is shown coupled to a data plane interface 304 (e.g., bus interconnect 132) that interfaces to the host CPU 105 executing a fast upgrade application 302. The host CPU 105 also executes control-plane operations that manages and maintains a plurality of data-plane-associated tables (e.g., L2 MAC table; MAC learning tables; L3 tables; RIB, FIB, etc.), shown in FIG. 3 as resources 210a-210d, of the network device 100 (e.g., 100a-100e). The fast upgrade operations 302 (e.g., FSU) provide instructions to the host CPU 105 to pre-compute filters 204 to install on the protocol state transition and/or resource state transition tracker module 200d (shown as "Filter 1" 204a, "Filter 2" 204b, "Filter 3" 204c, and "Filter n" 204d). The filters (e.g., 204a-204d) executing on the protocol state transition and/or resource state transition tracker module (e.g., 200d) facilitate the tracking of protocol state transitions and/or resource state transitions when the host CPU 105 is unavailable, e.g., during a fast software upgrade operation (e.g., FSU).

Figure 4:
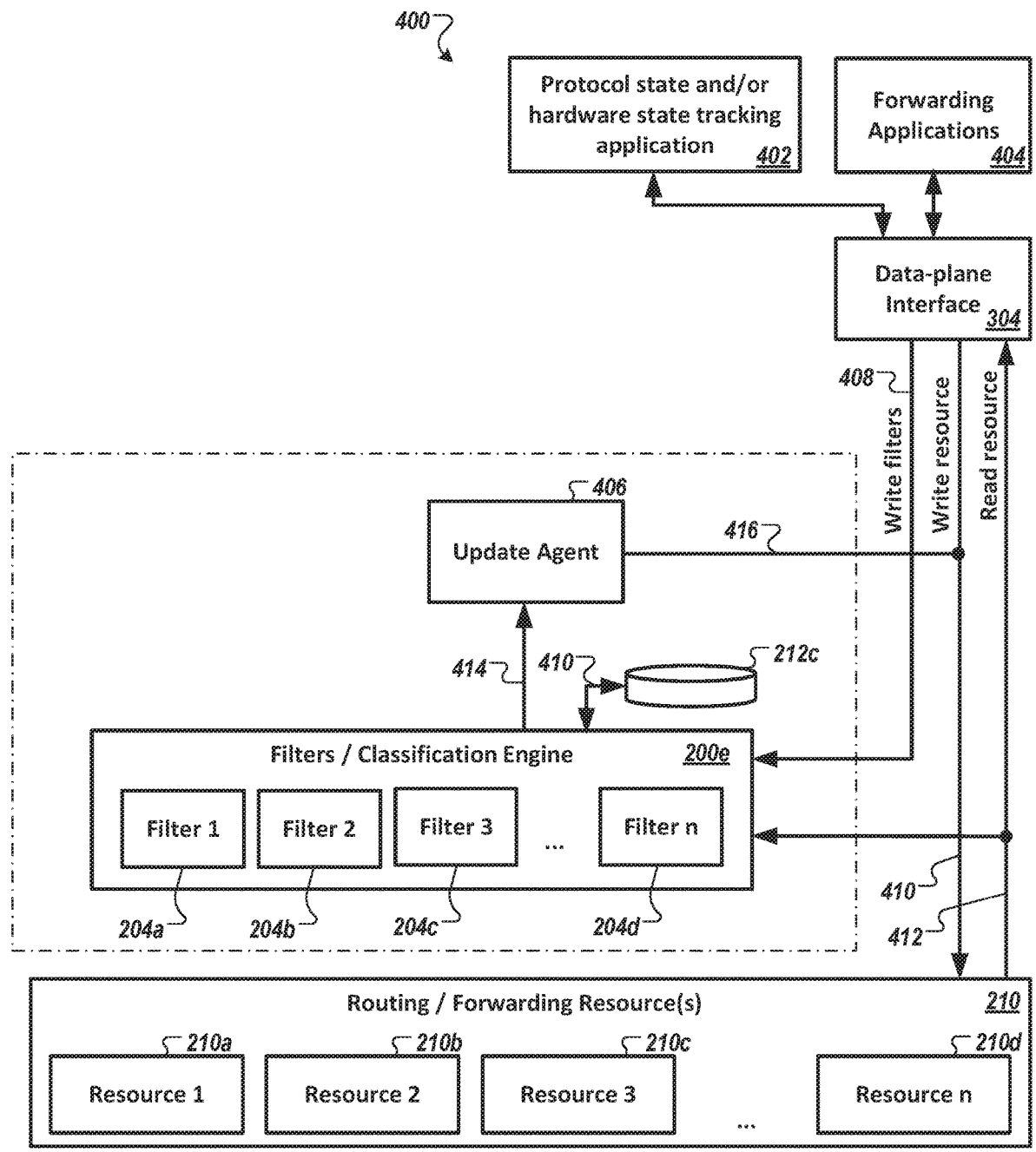
FIG. 4 shows an exemplary network device configured to perform updates to data plane resources during a software upgrade operation, e.g., as described in relation to FIG. 3, in accordance with an illustrative embodiment.

FIG. 4 shows an exemplary network device 100 (shown as 400) configured to perform updates to data plane resources during a software upgrade operation, e.g., as described in relation to FIG. 3, in accordance with an illustrative embodiment. In FIG. 4, the protocol state transition and/or resource state transition tracker module 200 (shown as "Filters/Classification Engine" 200e) is configured to scan through sets of fields in received protocol control-plane messages. The filters 204a-204d may be generated by the host CPU 105, e.g., executing the fast upgrade application 302 (shown as "Protocol State and/or hardware state tracking application") 402 and installed in the Filters/Classification Engine 200e through the data-plane interface (shown as "Write filters" 408). The data-plane interface 304 may be a data-plane access driver that provides access to the data-plane devices (e.g., NPU, Switching-ASIC) and data-plane resources by the forwarding application and/or engine 404. Upon a match, the protocol state transition and/or resource state transition tracker module 200e is configured, in some embodiments, to store a matched event (410), e.g., as a hit counter or a hit flag, to a table or database 212 (shown as 212c). Subsequently, the table or database (e.g., 212c) may be accessed by the control plane, e.g., executed by the host CPU 105 (shown as forwarding applications 404) executing the instructions associated with the Protocol State and/or hardware state tracking application 402. The forwarding application 404 is configured to manage and maintain a plurality of data-plane-associated tables (e.g., L2 MAC table; MAC learning tables; L3 tables; RIB, FIB, etc.) of a switch-fabric of the network device 100 (e.g., 400) by performing reading and writing operations to such resources (shown as "Write resource" 410 and "Read resource" 412) through the data-plane interface 304.

In other embodiments, the protocol state transition and/or resource state transition tracker module 200e is configured, upon determining a matched event (e.g., matched field(s) in a received protocol control-plane message), to send a command (414) to an update agent 406 (e.g., 208a, 208c) configured to perform an update to the intended routing or forwarding resource (shown as 210a, 210b, 210c, and/or 210d). The update agent 406 may include a queue (e.g., FIFO) to which the command is processed in accordance with the sequence it is received. In some embodiments, the command may include an identifier of a matched filter from a plurality of filters to which corresponding action sequences/instructions may be identified and/or retrieved. In FIG. 4, the update agent 406 is configured to write (416) the appropriate data plane resource 210 using addresses of the data plane resource as identified in an action instruction corresponding to the matched filter.

Example Methods of Operation of Fast Upgrade Operation

Figure 6:
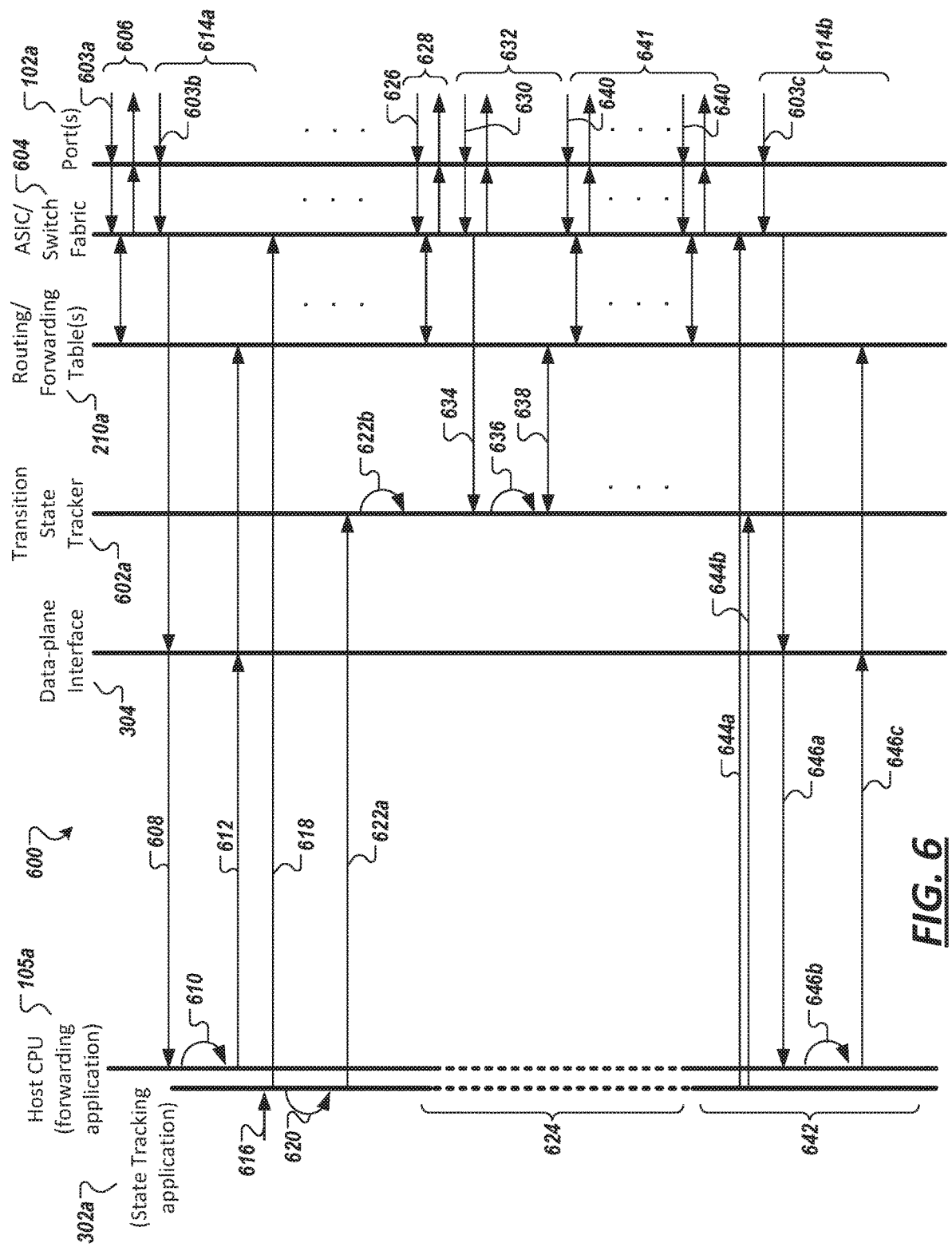
FIG. 6 shows an exemplary timing diagram of a method of executing fast upgrade operations in a network device configured with an exemplary protocol state transition and/or resource state transition tracker module in accordance with an illustrative embodiment.

FIG. 6 shows an examplary timing diagram 600 of a method of executing fast upgrade operations in a network device configured with an exemplary protocol state transition and/or resource state transition tracker module 200 (shown as "Transition State Tracker" 602a) in accordance with an illustrative embodiment. In FIG. 6, prior to a fast upgrade operation (e.g., FSU), data-plane and control-plane associated packets (shown as 603a for data associated packets and 603b for control-plane associated packets) received at ports 102 (shown as "Port(s)" 102a) of a network device (e.g., 100) are routed to appropriate ports (also shown as 102a) of the device through switch-gear hardware and/or switch fabric (shown as "ASIC/Switch Fabric" 604) (e.g., corresponding to 106, 112, 116, etc.). As shown in FIG. 6, data packets 603a are switched (sequence 606) through the ASIC/Switch Fabric (604), which may access routing/forwarding table(s) 210a, and control-plane associated packets 603b (in sequence 614a) are directed (608) to the control plane executed, in part, by the host CPU 105 (shown as "Host CPU (forwarding application" 105a) that parses (610) the control-plane associated packets 603b to update (612) the appropriate routing/forwarding table(s) 210a of determined changes.

Referring to FIG. 6, upon receiving a command (616) to initiate a fast upgrade operation from a fast-upgrade application 302 (shown as "State-Tracking application" 302a), the state-tracking application 302a is configured, in some embodiments, to send a notification message 618 to the ASIC/Switch Fabric (604) that directs the ASIC/Switch Fabric (604) to relay subsequent received control-plane associated packets (e.g., 630) to the protocol state transition and/or resource state transition tracker module 200 (shown as the "transition state tracker" 602a), e.g., in addition to relaying it the data-plane interface 304. The state-tracking application 302a also directs the host CPU 105a to compute (620) a set of filters 204 that are then installed (shown as 622a and 622b) onto the transition state tracker 602a. Examples of filters 204 are provided in FIGS. 9 and 10, which is subsequently discussed herein. In some embodiments, corresponding action instructions/sequences 206 are also computed in step 620 along with the computation of the filters 204.

Referring still to FIG. 6, upon the transition state tracker 602a being configured with the set of filters 204, the host CPU and forwarding application 105a is subsequently disabled and thus made unavailable (shown as 624) for control plane update.

As shown in FIG. 6, during the unavailable period (624) of the forwarding application 105a, data packets 626 are switched (sequence 628) through the ASIC/Switch Fabric (604), in essence "headless" with respect to the forwarding application 105a. However, control-plane associated packets 630 (in sequence 632) are directed (634) to the transition state tracker 602a that scans (636), for example, the headers of the packet 630 using address(es) and value(s) provided in the filters 204. Upon determining a match with a filter, the transition state tracker 602a, in some embodiments, and as shown in FIG. 6, is configured to direct (638) (e.g., an updater (e.g., 208a, 208c)) an update to the appropriate routing/forwarding table(s) 210a of the determined changes using the appropriate action instructions/sequences 206 corresponding to the matched filter. Subsequently, a data packet subsequently received (640) that relies on that portion of the routing/forwarding table(s) 210a may be routed (shown in sequence 641) based on the updated control-plane protocol state information (e.g., in 630) while the network device 600 is running headless without the host CPU and/or forwarding application 105a.

Referring still to FIG. 6, subsequently (shown in period 642), once the host CPU and/or forwarding application 105a becomes available, the state-tracking application 302a sends a notification/command(s) (shown as 644a and 644b, respectively) to the transition state tracker 602a and the ASIC/Switch Fabric 604 to notify them that the forwarding application 105a has transition from the unavailable state to an available state. The transition state tracker 602a, in some embodiments, is configured to disable the filtering/classification operation. In some embodiments, the transition state tracker 602a uninstalls the filters 204. In some embodiments, the transition state tracker 602a is un-instantiated and hardware/software resources associated therewith are freed/made available.

With the forwarding application 105a now available, subsequent received control-plane associated packets 603c (in sequence 614b) are directed (646a) to the control plane (105a) that parses (646b) the control-plane associated packets to update (646c) the appropriate routing/forwarding table(s) 210a of determined changes.

Figure 7:
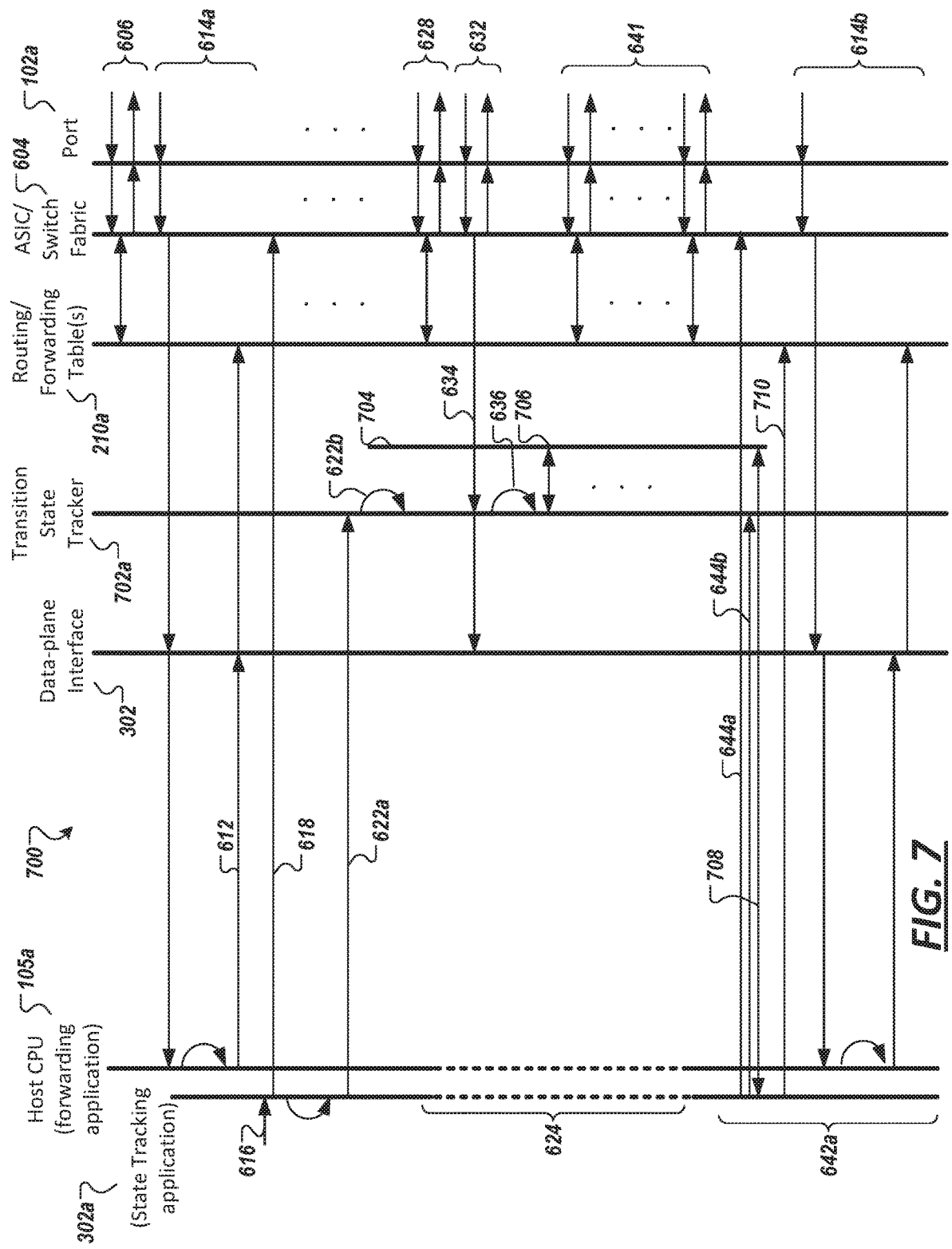
FIG. 7 shows an exemplary timing diagram of another method of executing fast upgrade operations in a network device configured with an exemplary protocol state transition and/or resource state transition tracker module in accordance with an illustrative embodiment.

FIG. 7 shows an examplary timing diagram 700 of another method of executing fast upgrade operations in a network device configured with an exemplary protocol state transition and/or resource state transition tracker module 200 (also shown as "Transition State Tracker" 702a) in accordance with an illustrative embodiment. FIG. 7 shows similar operations (e.g., 606, 614a, 612, 618, among others), as described in relation to FIG. 6.

However, rather than the transition state tracker 702a performing the updates to the data plane resource, FIG. 7 shows the transition state tracker 702a being configured to store (706) the tracked protocol state transition (and/or hardware resource state transitions) in a table or database 704. Subsequently, once the host CPU 105a becomes available, the host CPU 105a can access (708) and update (710) the tracked protocol state transition (and/or hardware resource state transitions) from the database to the appropriate data plane resource. Example of such operations is described in relation to FIG. 12. In addition, examples of filters may be used are described in relation to FIGS. 9 and 10. In some embodiments, the host CPU 105a may compute corresponding action instructions/sequences 206 with the filters 204 and store the computed action instructions/sequences in persistent memory for later use. In other embodiments, the host CPU 105a is configured to compute the filters 204 and perform computations of appropriate action instructions/sequences 206 only for a given matched filter following the upgrade (shown in FIG. 7 as 642a).

Figure 11:
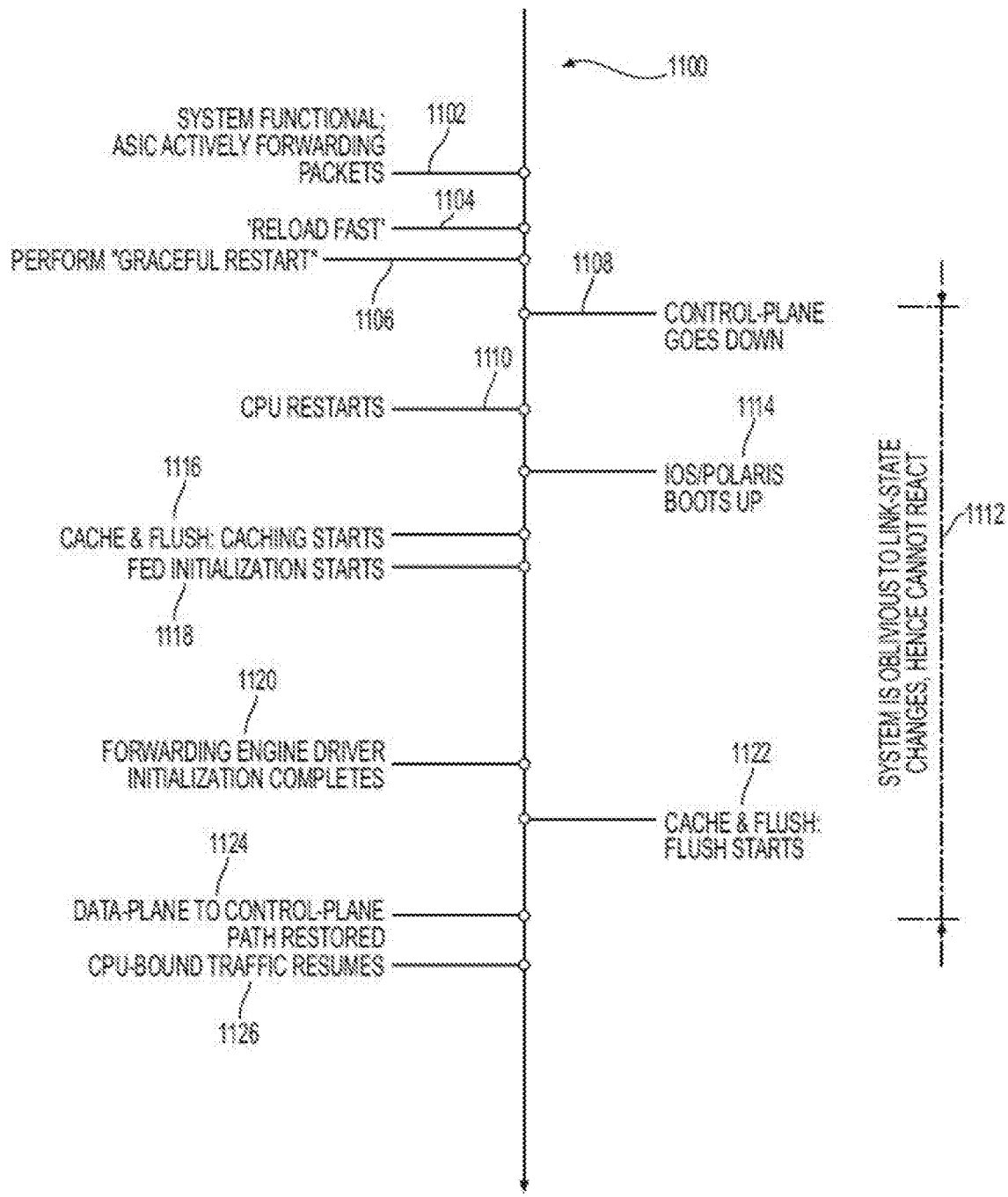
FIG. 11 shows a timing diagram for an example baseline software upgrade operation for a switch network device in which a protocol state transition and/or resource state transition tracker module.
Figure 12:
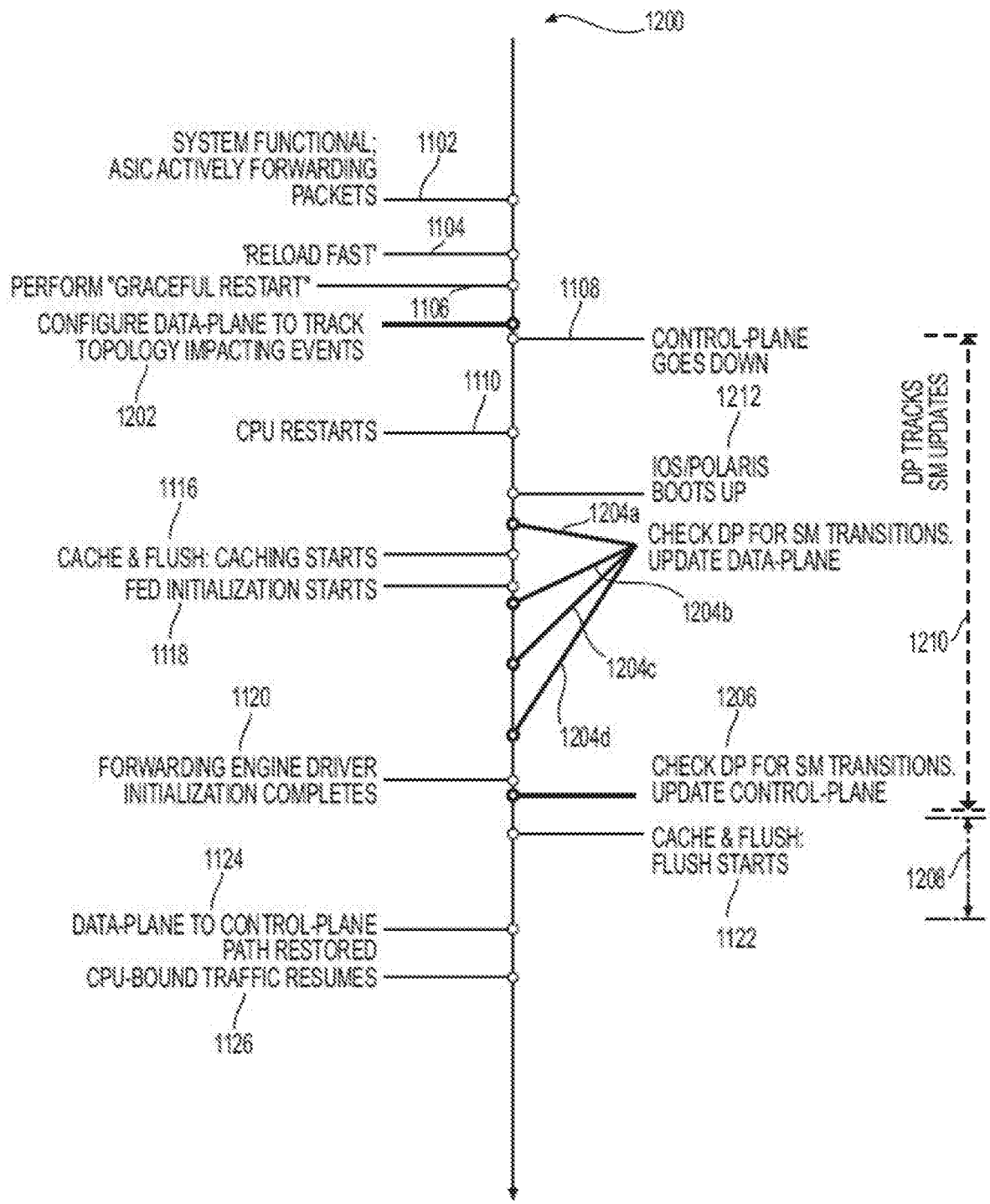
FIG. 12 shows a timing diagram for an example fast-software upgrade operation for a switch network device in which the network device is configured with a protocol state transition and/or resource state transition tracker module in accordance with an illustrative embodiment.
Figure 13:
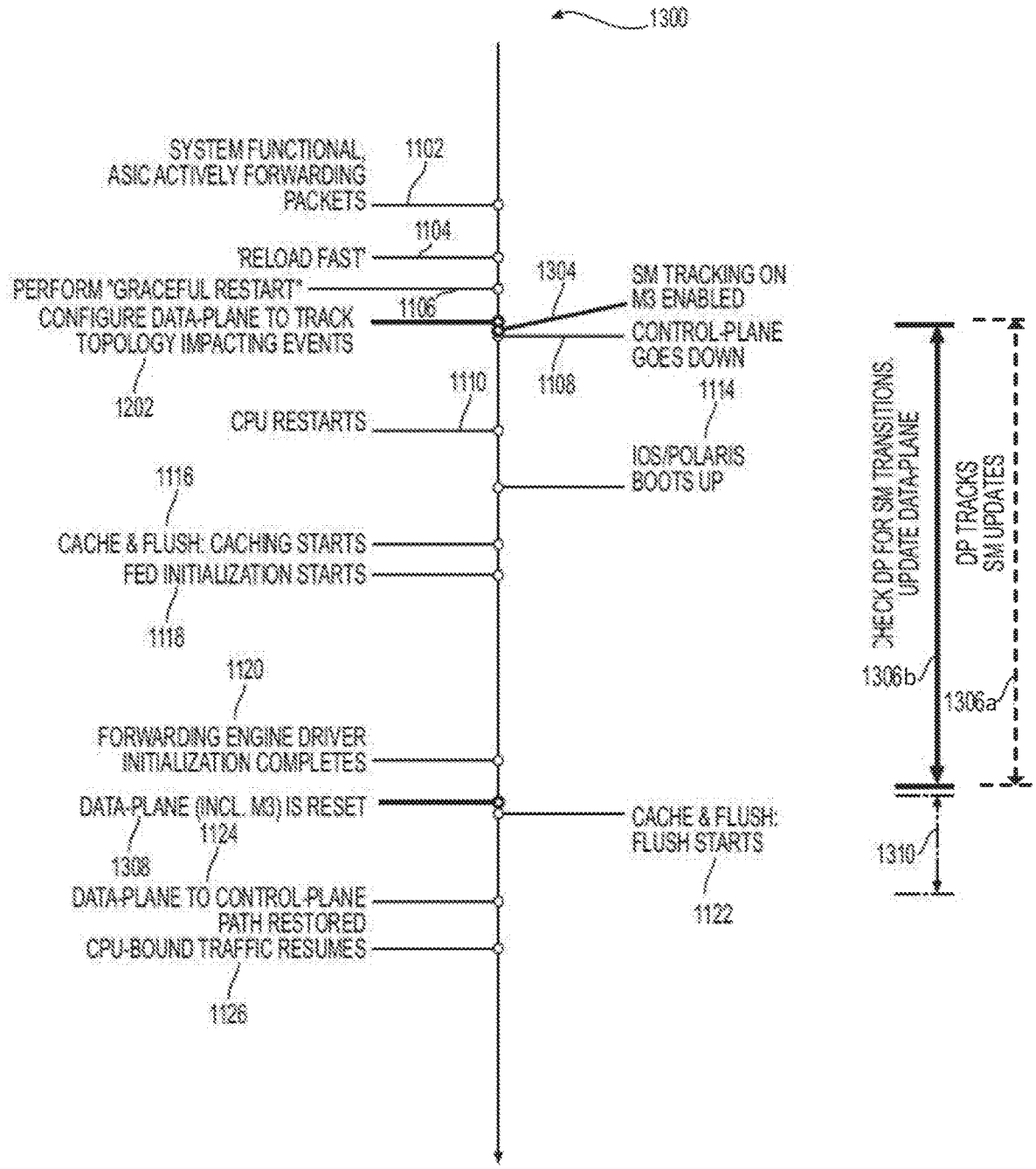
FIG. 13 shows a timing diagram for another example fast-software upgrade operation for a switch network device in which the network device is configured with a protocol state transition and/or resource state transition tracker module in accordance with another illustrative embodiment.

FIGS. 11, 12, and 13 show exemplary methods of operations 1100, 1200, 1300 to perform fast software upgrade for certain classes of switch network devices in accordance with an illustrative embodiment.

Specifically, FIG. 11 shows a timing diagram for an example baseline software upgrade operation (1100) for a switch network device in which a protocol state transition and/or resource state transition tracker module is not implemented. FIGS. 12 and 13 each shows a timing diagram for an example fast-software upgrade operation (1200), similar to those of FIG. 11, for a switch network device but one in which the network device is configured with a protocol state transition and/or resource state transition tracker module in accordance with an illustrative embodiment. In FIG. 12, the protocol state transition and/or resource state transition tracker module 200 is configured for staggered tracking operation with a second thread in the host CPU in which the protocol state transition and/or resource state transition tracker module 200 is implemented in a data plane component to monitor for protocol state transitions while the main thread of the host CPU is unavailable and to provide the tracked transitions to the secondary tread to update the data plane resource while the main thread is unavailable. Similar operations may be performed for hardware resource transitions. Additionally, the main thread executing the operating system on the host CPU may perform the update the data plane resource once it becomes available.

In FIG. 13, the protocol state transition and/or resource state transition tracker module 200 is configured to monitor for protocol and/or hardware resource state transitions while the host CPU is unavailable and to provide the provide the tracked transitions to secondary processing unit (e.g. a system-on-a chip) to update the data plane resource while the host CPU is unavailable. Indeed, the protocol state transition and/or resource state transition tracker module 200 may track state changes while the control plane is disabled (i.e., and the data plane is operating headless) to which some update mechanisms can be performed.

Baseline Fast Software Upgrade

As noted above, FIG. 11 shows a timing diagram for an example baseline software upgrade operation (1100) for a switch network device in which a protocol state transition and/or resource state transition tracker module is not implemented. In FIG. 11, the process 1100 is shown beginning with the ASIC actively forwarding packets (1102) in normal operation. Upon receipt of a fast reload command (shown as "reload fast' 1104), e.g., for fast upgrade, the software upgrade operation 1100 initiates. Peer related operations are first disabled (1106), e.g., via a graceful restart operation being initiated. Graceful restart involves a given network device transmitting a message to peer nodes to inform its adjacent neighbors and peers that the network device is entering maintenance/restart mode. During a graceful restart, the restarting device and its neighbors may continue forwarding packets without disrupting network performance.

Once ready, the control plane of the upgrading device is disabled (1108) in that updates to the data plane as a results of protocol state transitions or hardware state transition are not processed, and the host CPU is restarted (1110) with a new kernel being loaded. As shown in FIG. 11, the control plane is fully or partially disabled for a period of time (1112) in that it cannot process any control plane traffic during this period, and the system is unaware of link-state or protocol-state changes. During the software upgrade, the host CPU is booted with a different and new kernel/system image. Once the kernel is loaded, the operating system is booted (1114). In network devices manufactured by Cisco Technology, Inc (San Jose, Calif.), operating system may include Polaris, IOS XE, IOS XR, & IOS Classic (shown in FIG. 11 as "ISO/POLARIS"). Other operation systems may be similarly rebooted. Following bootup of the operating system, the forwarding application is initialized (shown as 1118 to 1120) along with various auxiliary services performed by the operating system. In some embodiments, cache and flush operation is performed to create data-plane resource shadows. Example of cache and flush operation is described in U.S. patent application Ser. No. 16/542,183, filed Aug. 15, 2019, entitled "Dynamic Hardware Resource Shadowing," which is incorporated by reference herein. In some embodiments, cache and flush operation invokes one or more resource shadow operation(s) that instantiate a shadowing services agent that creates an instance of a shadow copy of a data plane resource (e.g., MAC table, FIB table, RIB table, ACL table) that can be used to restore the control plane forwarding application once re-initialized. In some embodiments, the caching operation of the cache and flush operation may take minutes to perform (e.g., from 1116 to 1122) while the flushing operation (e.g. initiated at 1122) takes only a few seconds to execute. Subsequently, the host CPU core operation is resumed (1124) (shown as "Data-Plane to Control-Plane Path Restored" 1124), and forwarding application is signaled (1126) to continue (shown as "CPU-Bound Traffic Resumes" 1126).

In some embodiments, though not shown (e.g., where cache and flush operation is not used), the control plane upon being initialized is configured to calculate and re-populate MAC table(s), FIB table(s), RIB table(s), ACL table(s), among others. Such processes may be in the order of minutes.

Fast Software Upgrade with Staggered Tracking Operation

As noted above, FIG. 12 shows a timing diagram for a fast-software upgrade operation (1200) in which a protocol state transition and/or resource state transition tracker module 200 is configured for staggered tracking operation with a second thread executed on the host CPU in which the protocol state transition and/or resource state transition tracker module 200 is implemented in a data plane component to monitor for protocol state transitions while the main thread executing the operating system on the host CPU is unavailable and to provide the tracked transitions to the second thread of the host CPU to update the data plane resource once the main thread of the host CPU is unavailable.

As shown in FIG. 12, the process 1200 is shown beginning with the ASIC actively forwarding packets (1102) in normal operation as shown in FIG. 11. Graceful operation 1106 is performed and updates to the control plane by the host CPU 105 is disabled (1108) while the host CPU is restarted (1110) with a new kernel. However, rather than having a period 1112 in which the control plane traffic cannot be tracked, FIG. 12 shows a period 1210 in which the data plane component is tracking control plane traffic (shown as "DP Tracks SM Updates" 1210). To facilitate such operation, in FIG. 12, the host CPU 105 is shown computing and installing filters 204 (shown as "Configure Data-Plane to Track Topology Impacting Events" 1202) in a protocol state transition and/or resource state transition tracker module 200 executing in a data-plane components. Example methods to compute and install filters 204 are described in relation to FIG. 2A, FIG. 2B, FIG. 2C, FIG. 3, FIG. 4, FIG. 5A, FIG. 5B, FIG. 6, FIG. 7, and FIG. 8. As discussed above, in some embodiments, the protocol state transition and/or resource state transition tracking module 200 is installed with filters and is executed in a data plane resource/component such as TCAM, ACL, DPI engine, etc. To this end, the protocol state transition and/or resource state transition tracker module 200 can track control plane traffic during period 1210 while the operating system executing on the host CPU is booting and unavailable.

FIG. 12 shows a second thread being executed in the host CPU 105 while the main thread executing the operating system, which takes longer to boot, is booting. In FIG. 12, when the new kernel being loaded, a second thread (or a set of treads) that is a separate independent thread from the main thread is also executed in the host CPU 105. Initialization of both the main thread and the second thread is shown as "IOS/Polaris Boots up" 1212. In some embodiments, when the second thread is executed, a minimal set of data-plane drivers is loaded during 1118. To this end, the protocol state transition and/or resource state transition tracker module 200 executing in the data-plane components can track the entirety of when the host CPU and its associated control plane operation is not operational while minimal control plane operations can be restored (prior to the full operating system operation) to service, in a staggered manner, state transition updates that were identified by the protocol state transition and/or resource state transition tracker module 200 during such periods prior to the main thread of the operating system being fully restored.

In FIG. 12, state transitions are shown being identified by the protocol state transition and/or resource state transition tracker module 200 at time 1204a, 1204b, 1204c, and 1204d. However, the actual updates to the data plane may be performed at 1204b, 1204c, and 1204d once the second thread executing the updater is executed at 1118.

Indeed, the staggered tracking method facilitates the tracking of protocol state transition by data plane components when the main thread of the host CPU 105 is unavailable to perform such tracking. In the example of FIG. 12, the host CPU 105 performs the update in a second thread. As discussed herein, other mechanism to perform the update may be used when the host CPU is available or unavailable. For example, state transition updates that were identified by the protocol state transition and/or resource state transition tracker module 200 can be updated by the main thread (rather than the second thread) when the operating system is fully restored. Additionally, in some embodiments, state transition updates that were identified by the protocol state transition and/or resource state transition tracker module 200 can be updated by a secondary processing unit, e.g., as later described in relation to FIG. 13.

In addition, FIG. 12 presents the protocol state transition and/or resource state transition tracking module 200 in the context of fast upgrade operation. Indeed, similar operations may be used to load sharing and load balancing as discussed herein. In combination with cache and flush operation which can restore data plane resource from a generated shadow copy, the time that the data-plane and control-plane are fully restored (shown as 1208) is indeed substantially reduced as compared to the unavailable time of the control plane as shown in FIG. 11. In some embodiments, the second thread may provide "alive" response, e.g., to any control plane inquiry, as a proxy to the main thread executing the operating system.

Fast Software Upgrade with System-on-a-Chip

As noted above, FIG. 13 shows a timing diagram of an example fast-software upgrade operation 1300 for the switch network device of FIG. 11 configured with the protocol state transition and/or resource state transition tracker module 200 that is configured to monitor for protocol and/or hardware resource state transitions while the host CPU is unavailable and to provide the provide the tracked transitions to secondary processing unit (e.g. a system-on-a chip) to update the data plane resource while the host CPU is unavailable.

As shown in FIG. 13, similar to the description of FIG. 12, the process 1300 is shown beginning with the ASIC actively forwarding packets (1102) in normal operation as shown in FIG. 11. Graceful operation 1106 is performed and updates to the control plane by the host CPU 105 is disabled (1108) while the host CPU is restarted (1110) with a new kernel. However, rather than having a period 1112 in which the control plane traffic cannot be tracked, FIG. 13 shows a period in which the data plane component (executing the protocol state transition and/or resource state transition tracker module 200) is tracking control plane traffic (shown as "DP Tracks SM Updates" 1306a) via filters executing there at and providing, directly or indirectly, identified tracked transitions to a secondary processing unit that performs the updates to the appropriate data plane resource. To facilitate such operation, in FIG. 13, the host CPU 105 is shown computing and installing filters 204 (also shown as "Configure Data-Plane to Track Topology Impacting Events" 1202) in a protocol state transition and/or resource state transition tracker module 200 executing in a data-plane components. As noted above in relation to FIG. 12, example methods to compute and install filters 204 are described in relation to FIG. 2A, FIG. 2B, FIG. 2C, FIG. 3, FIG. 4, FIG. 5A, FIG. 5B, FIG. 6, FIG. 7, and FIG. 8, and the protocol state transition and/or resource state transition tracking module 200 may be installed with filters and is executed in a data plane resource/component such as TCAM, ACL, DPI engine, etc. To this end, the protocol state transition and/or resource state transition tracker module 200 can track control plane traffic during period 1306 while the operating system executing on the host CPU is booting and unavailable.

FIG. 13 shows a secondary processing unit (referenced as "M3" in FIG. 13) being programmed with action instructions/sequences to perform updates to the data plane resource when the host CPU and corresponding operating system are booting. In FIG. 13, as noted above, the host CPU 105 is shown computing and installing filters in a protocol state transition and/or resource state transition tracker module 200 executing in a data-plane component at 1202. Then, the protocol state transition and/or resource state transition tracker module 200 is shown enabled at 1304 (shown as "SM Tracking On" 1304). At the same time, or contemporaneous therewith, the secondary processing unit is enabled 1304. After such time, any protocol state transitions or resource hardware transitions is tracked (shown as "DP Tracks SM Updates" 1306a) by the protocol state transition and/or resource state transition tracker module 200 and corresponding updates to a data plane resource (e.g., 210) is performed by the secondary processing unit (shown as "Check DP for SM Transitions—Update Data-Plane" 1306b).

To this end, the protocol state transition and/or resource state transition tracker module 200 executing in the data-plane components can track the entirety of when the host CPU and its associated control plane operation is not operational while the secondary processing unit (M3) can service such tracked transition. In embodiments in which a data-plane component can not track the state transition (e.g., certain hardware resource state transitions), an embedded micro-controller or logic circuit may be used to implement the protocol state transition and/or resource state transition tracker module as well as the protocol and/or hardware resource state updater (e.g., 208c).

In FIG. 12, state transitions received through a protocol packet are shown being identified by the protocol state transition and/or resource state transition tracker module 200 executing in the data plane while, FIG. 13, hardware resource transitions that are not received via a protocol packet is updated by the secondary processing unit (M3). In the example shown in FIG. 13, the secondary processing unit is shown reset at 1308 after the forwarding application is initialized at "forwarding engine driver initialization completes" 1120.

Indeed, other mechanism to perform the update may be used when the host CPU is available or unavailable. For example, state transition updates that were identified by the protocol state transition and/or resource state transition tracker module 200 can be updated by the host CPU once it's fully restored or partially restored (e.g., per FIG. 12). Additionally, in some embodiments, protocol or hardware resource state transition updates that were identified by the protocol state transition and/or resource state transition tracker module 200 can be updated by the secondary processing unit.

In addition, FIG. 13 presents the protocol state transition and/or resource state transition tracking module 200 in the context of fast upgrade operation. Indeed, similar operations may be used to load sharing and load balancing as discussed herein. In combination with cache and flush operation which can restore data plane resource from a generated shadow copy, the time that the data-plane and control-plane are fully restored is indeed substantially reduced as compared to the unavailable time of the control plane as shown in FIG. 11. In some embodiments, the second processing unit may provide "alive" response, e.g., to any control plane inquiry, as a proxy to the application executing on the host CPU 105.

Example Protocol State and Hardware Resource State Transition Filters

Figure 9:
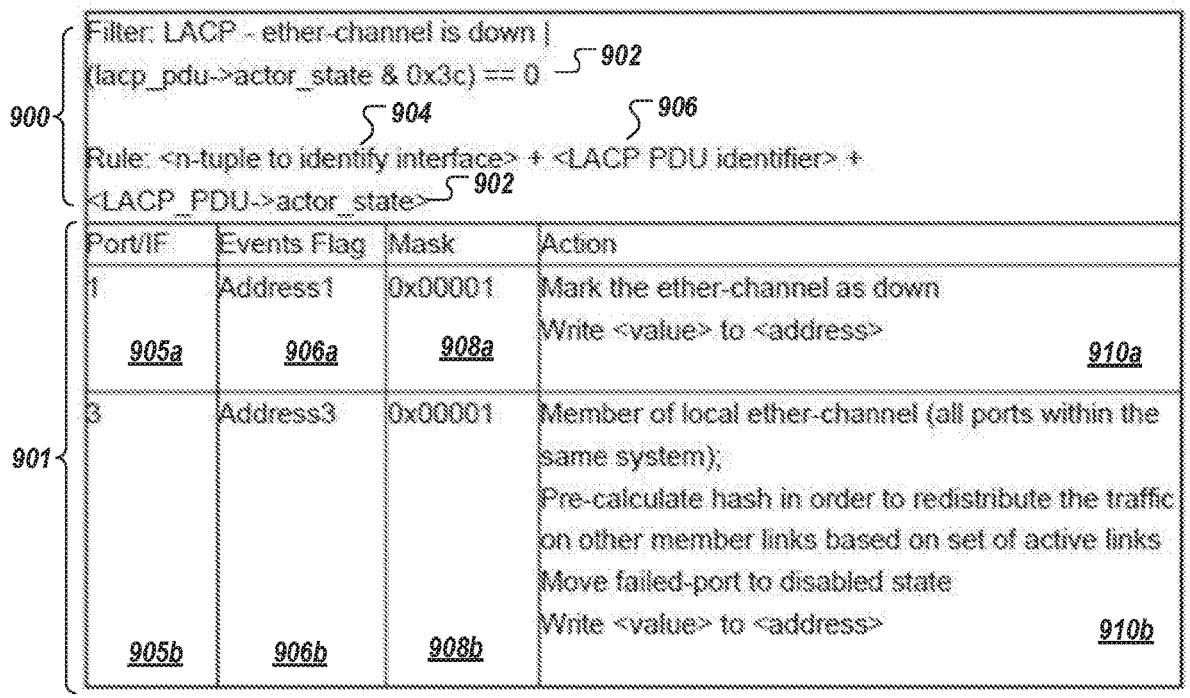
FIG. 9 show an exemplary protocol state transition filter configured to execute on the protocol state transition and/or resource state transition tracking module and corresponding actions sequence associated with a matched instance of the filter in accordance with an illustrative embodiment.

FIG. 9 show an exemplary protocol state transition filter 204 (shown as 900) configured to execute on the protocol state transition and/or resource state transition tracking module 200 as well as corresponding action instructions/sequences 206 (shown as 901) in accordance with an illustrative embodiment. The action instructions/sequences 901 may be pre-computed along with the protocol state transition filter 900 to be executed in a data plane component. In other embodiments, the action instructions/sequences 901 may be performed by a second thread in the host CPU or main thread in the host CPU (e.g., as described in relation to FIG. 12), in a secondary processing unit (e.g., as described in relation to FIG. 13).

Figure 10:
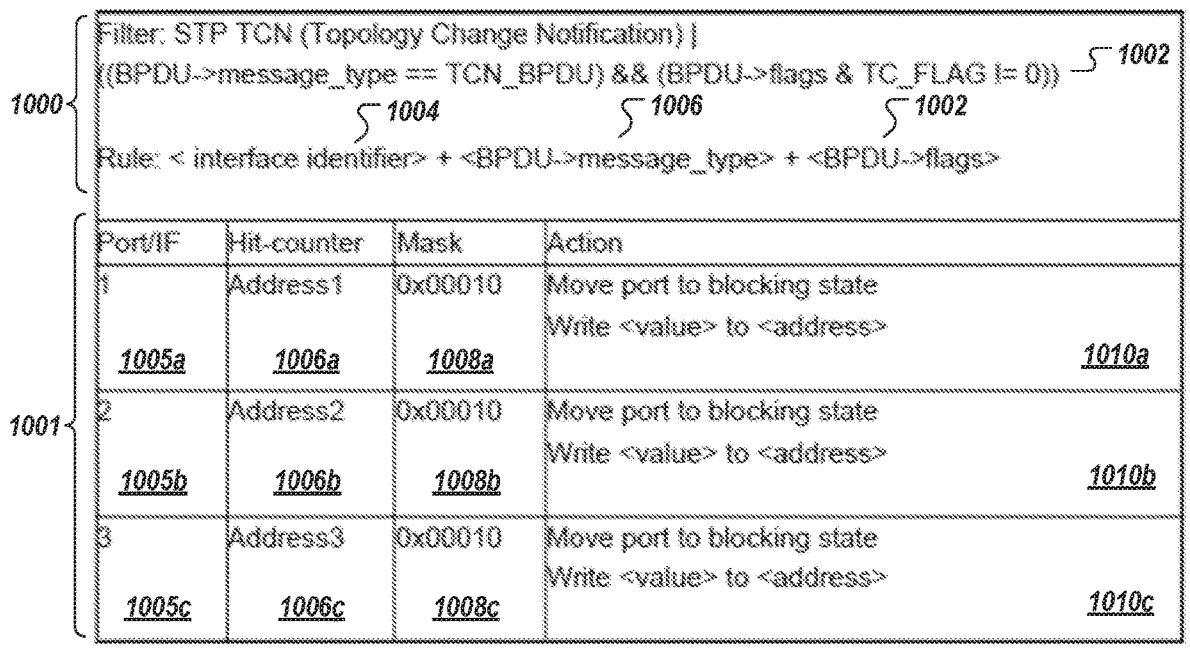
FIG. 10 show an exemplary hardware resource state transition filter configured to execute on the protocol state transition and/or resource state transition tracking module and corresponding actions sequence associated with a matched instance of the filter in accordance with an illustrative embodiment.

FIG. 10 show an exemplary hardware resource state transition filter 204 (shown as 1000) configured to execute on the protocol state transition and/or resource state transition tracking module 200 as well as corresponding action instructions/sequences 206 (shown as 1001) in accordance with an illustrative embodiment.

Indeed, the mechanism as described herein may be generalized to be used in any switching devices in which protocol state tracking and/or hardware resource tracking is desired during headless operation of the data-plane. In some embodiments, the protocol state tracking (e.g., in the context of FSU) may include LACP (Link Aggregation Control-Protocol), CDP/LLDP (neighbor change) and RSTP.

LACP Filter/Rule Example. As shown in FIG. 9, the protocol state transition and/or resource state transition tracking module 200 may be configured with a rule 204 (shown as 900) that scans for when an ether-channel is down. The filter 900 may include instructions 902 for the protocol state transition and/or resource state transition tracking module 200 to scan the header of a given LACP protocol data unit (DPU) message for the actor-state field (902) as well as the n-tuple used in the system to identify a given interface (904) and the LACP control PDU (906) within the LACP PDU.

When a peer node brings down an ether-channel link, the LACP protocol is expected to send out a PDU with an 'actor state' field (partner's port state) indicating that the link is going down. Actor-state field in LACP PDU is 8-bits wide. In FIG. 9, the protocol state transition and/or resource state transition tracking module 200, in executing a filter 900, may apply a mask of "0x3c", e.g., via an "AND" operator, to the actor-state field as shown in 902, and if none of the bits in the mask (e.g., bits 2, 3, 4, and 5) are set, then the resulting operation indicates that the corresponding ether-channel is down. The protocol state transition and/or resource state transition tracking module 200 may store a hit flag or hit counter associated with a matched filter in a table or database. As shown in FIG. 9, the protocol state transition and/or resource state transition tracking module 200 is configured to store the hit flag or hit counter at an address shown as addresses 906a and 906b in "Events Flag". Indeed, the address specified under the "Events-flag" refers to a location in the table or database, e.g., in a data-plane resource, which tracks the corresponding hit-counter/hit-flag for a given filter 204 (e.g., 900).

The corresponding action instruction/sequence 206, as shown in FIG. 9, includes a mask (e.g., 908a and 908b) to apply to an address (e.g., 906a and 906b) in the table or database (e.g., 212). As shown in FIG. 9, the updater (e.g., 208c) applies the mask (e.g., 908a, 908b) to a value read from an address of the event flags. In the example shown in FIG. 9, a protocol state transition associated with port "1" is shown as a hit-flag bit 0 ("0x00001") at "address 1" and a protocol state transition associated with port "3" is shown as a hit-flag bit 0 ("0x00001") at "address 3". To this end, when the updater apply a mask of "0x0001" to a value read from "Events-Flag:address1", the result indicates whether a filter matched any incoming control packets. If the hit-counter corresponding to the above rule is non-zero, then the updater (e.g., 208c) may update the appropriate data-plane resource to indicate that an interface is marked down. As shown in FIG. 9, when the port "1" is indicated to be down, the updater (e.g., 208c) may mark the ethernet-channel as down by writing an associated <value> to an <address> as shown in 910a. And, as shown in FIG. 9, when the port "2" is indicated to be shown, the updater (e.g., 208c) may mark all members of the local ethernet-channel as being down and may pre-calculate a hash to redistribute traffic on other member links based on a set of active links as shown in 910b. Such actions (e.g., 910a, 910b) may prevent forwarding of traffic on a stale adjacency and helps speed up the convergence.

RSTP Filter/Rule Example. As shown in FIG. 10, the protocol state transition and/or resource state transition tracking module 200 may be configured with a rule 204 (shown as 1000) that scans for when a port is brought down (that is, the port is disabled). The filter 1000 may include instructions 1002 for the protocol state transition and/or resource state transition tracking module 200 to scan a received Rapid Spanning Tree Protocol (RSTP) message for a change in a given spanning tree, e.g., as provided via a Topology Change Notification (TCN) message as well as the n-tuple used in the system to identify a given interface (1004) and the message type fields in the BPDU (e.g., TCN-BPDU) and the control flag fields (1006) within the RSTP TCN message.

In FIG. 10, the protocol state transition and/or resource state transition tracking module 200, in executing a filter 1000, may determine the message type field in BPDU is a "TCN_BPDU" and that the flags field in BPDU are "TC_FLAG" identify a RSTP TCN message. To this end, if TCN updates have been received on a given port, the updater (e.g., 208a, 208c) executing the corresponding action instructions/sequence 206 (e.g., 1001) can update the data plane resource to indicate that a port is blocked. As shown in FIG. 10, the protocol state transition and/or resource state transition tracking module 200 may store a hit flag or hit counter associated with a matched filter in a table or database as described in relation to FIG. 9. As shown in FIG. 10, the protocol state transition and/or resource state transition tracking module 200 is configured to store the hit flag or hit counter at an address shown as addresses 1006a, 1006b, 1006c in "Hit-Counter". Indeed, the address specified under the "Hit-Counter" refers to a location in the table or database, e.g., in a data-plane resource, which tracks the corresponding hit-counter/hit-flag for a given filter 204 (e.g., 1000).

The corresponding action instruction/sequence 206, as shown in FIG. 10, includes a set of masks (e.g., 1008a, 1008b, 1008c) to apply to respective addresses (e.g., 1006a, 1006b, 1006c) in the table or database (e.g., 212). As shown in FIG. 10, the updater (e.g., 208c) applies the mask (e.g., 1008a, 1008b, 1008c) to a value read from an address of the "Hit Counter". In the example shown in FIG. 10, a protocol state transition associated with port "1" (1005a) is shown as a hit-flag bit 2 "0x00010" (1008a) at "address 1" (1006a); a protocol state transition associated with port "2" (1005b) is shown as a hit-flag bit 2 "0x00010" (1008b) at "address 2" (1006b); a protocol state transition associated with port "3" (1005c) is shown as a hit-flag bit 2 "0x00010" (1008c) at "address 3" (1006c). To this end, when the updater apply a mask of "0x00010" to a value read from "Hit-Counter: address1", the result indicates whether a filter matched any incoming STP TCN message. If the hit-counter corresponding to the above rule is non-zero, then the updater (e.g., 208c) may update the appropriate data-plane resource to indicate that a port is blocked. As shown in FIG. 10, when the ports "1", "2", and "3" are indicated to be blocked, the updater (e.g., 208c) may mark the respective port as blocked by writing a respective associated <value> to a respective <address> as shown in 1010a, 1010b, and 1010c, respectively. Such actions (e.g., 1010a, 1010b, 1010c) may prevent forwarding of traffic to blocked ports that could create network issues such as loops or black holes.

Host CPU Load Balancing Application Using Example Protocol State Transition and/or Resource State Transition Tracker Referring back to FIG. 3, the examplary network device 100 (e.g., 300) may be alternatively, or additionally, configured with the protocol state transition and/or resource state transition tracker module 200 of FIG. 2A, 2B, or 2C to perform load balancing operations with the host CPU in accordance with an illustrative embodiment. As used herein, "load balancing" refers to the protocol state transition and/or resource state transition tracker module 200 performing filtering and/or updating of protocol state transitions or resource state transitions when the host CPU is overloaded.

During load balancing operations, the control plane may be periodically unavailable. In some embodiments, e.g., when monitored availability of the host CPU is determined to be below a specific threshold (say, 25% available load), a load sharing application 308 may direct the host CPU 105 to compute a set of filters 204 that are then installed on a protocol state transition and/or resource state transition tracker module 200 (e.g., 200a-200e) to offload such monitoring of certain protocol state transitions and/or resource state transitions from the host CPU.

In some embodiments, the network device may be a non-redundant, standalone fixed or modular switching systems. In other embodiment, the network device may be routers or other networking systems. An example of non-redundant, standalone fixed switching system is shown in FIG. 1B. An example of modular switching systems is shown in FIG. 1A.

Referring still to FIG. 3 (and FIG. 5A or 5B), when the load balancing operation is initiated, the control-plane determines (step 502) a set of filtering rules and installs (step 504) filtering rules in the protocol state transition and/or resource state transition tracker module 200d, e.g., in the data-plane. In some embodiments, the filtering rules may be derived, or received, from a network interface that provides for communication with a remote controller 306 (shown as "OpenFlow Controller" 306a). Corresponding action instructions/sequence 206 may be calculated concurrently with the filters 204 or may be calculated as needed.

The filters 204 (e.g., 204a-204d), in some embodiments, provide for the matching of state-transition messages for a set of protocols (e.g., those described herein). In some embodiments, for example, when a protocol's state update is communicated through a set of fields in that protocols' messages, the protocol state transition and/or resource state transition tracker module 200d is configured to look (step 506) for, e.g., scan, specific values in the fields and flags when a match is identified. In addition to specific protocol messages, the protocol state transition and/or resource state transition tracker module 200d may also track other events that may impact the forwarding topology (e.g., link down). The filtering logic may be implemented through a variety of hardware blocks (e.g., ACL TCAM). Any required resources are reserved at system startup.

Once the rules are configured in the protocol state transition and/or resource state transition tracker module 200d (e.g., in the data-plane), events that could impact the forwarding topology are flagged while the system (data-plane) in an overloaded state. The tracked information is then used to perform the necessary updates (step 508) to the data-plane (such as shutting down an adjacency, blocking a port etc.) to minimize the negative impact on the network.

As shown in FIG. 3, the protocol state transition and/or resource state transition tracker module 200d is shown coupled to a data plane interface 304 (e.g., bus interconnect 132) that interfaces to the host CPU 105 executing a load balancing operation 308. The host CPU 105 also executes control-plane operations that manages and maintains a plurality of data-plane-associated tables (e.g., L2 MAC table; MAC learning tables; L3 tables; RIB, FIB, etc.), shown in FIG. 3 as resources 210a-210d, of the network device 100 (e.g., 100a-100e). The load balancing operations 308 provide instructions to the host CPU 105 to pre-computer filters 204 to install on the protocol state transition and/or resource state transition tracker module 200d (shown as "Filter 1" 204a, "Filter 2" 204b, "Filter 3" 204c, and "Filter n" 204d). The filters 204a-204d executing on the protocol state transition and/or resource state transition tracker module 200d facilitate the tracking of protocol state transitions and/or resource state transitions when the host CPU 105 is overloaded (e.g., having a load level over a defined limit). The protocol state transitions and/or resource state transitions may be implemented in data plane components or in secondary processing unit as discussed herein. A updater (e.g., 208c) may be implemented in secondary thread in the host CPU (e.g., as describe in relation to FIG. 11) or in secondary processing unit (e.g., as describe in relation to FIG. 12).

FIG. 4 shows an exemplary network device 100 (shown as 400) configured to perform updates to data plane resources during load balancing operation, e.g., as described in relation to FIG. 3, in accordance with an illustrative embodiment. Examples of secondary thread and secondary processing units that may execute the updater (e.g., 208c) is described in relation to FIGS. 12 and 13.

Figure 8:
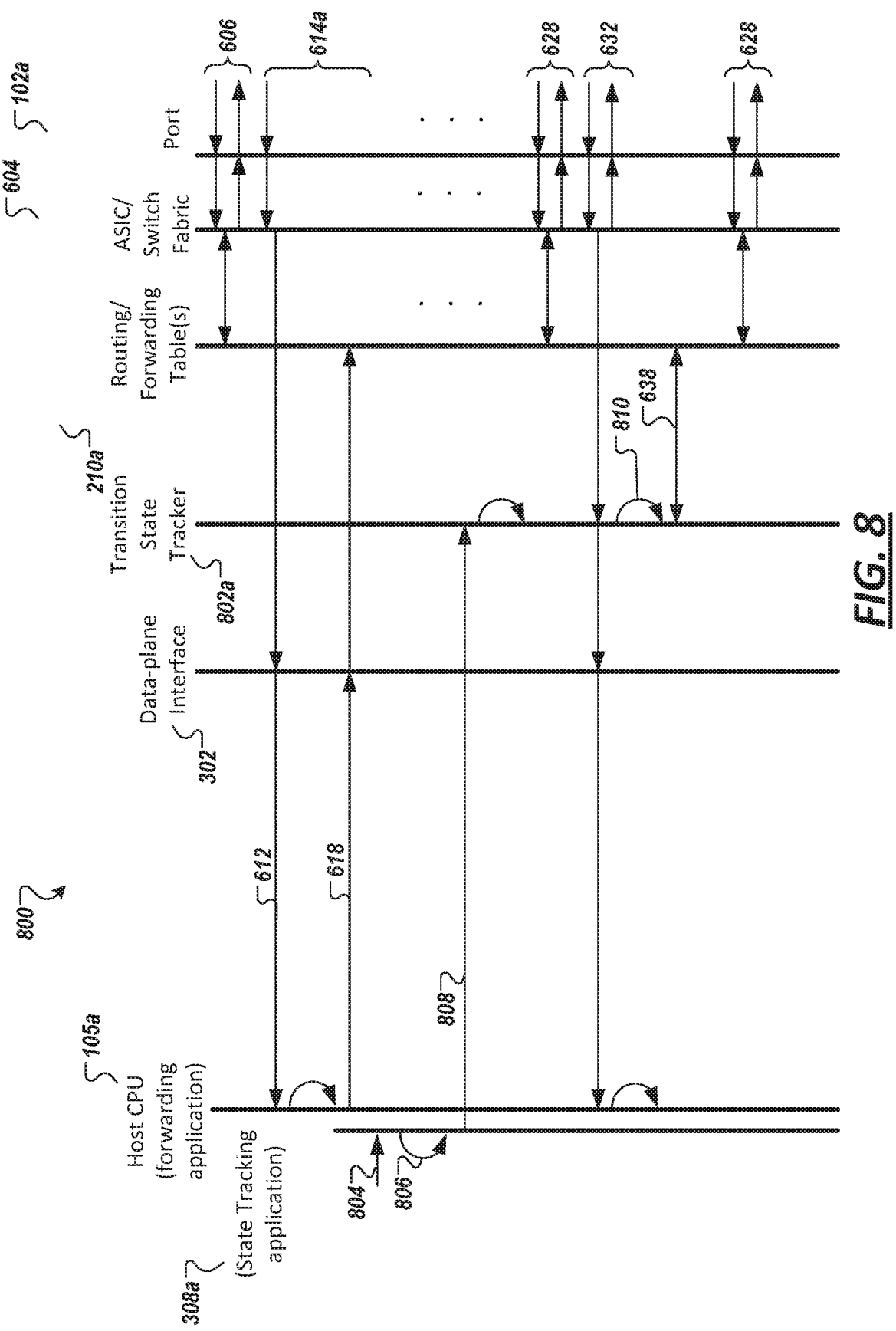
FIG. 8 shows an exemplary timing diagram of a method of executing load balancing and/or load sharing operations in a network device configured with an exemplary protocol state transition and/or resource state transition tracker module in accordance with an illustrative embodiment.

FIG. 8 shows an exemplary timing diagram 800 of a method of executing load balancing operations in a network device configured with an exemplary protocol state transition and/or resource state transition tracker module 200 (shown as "Transition State Tracker" 802a) in accordance with an illustrative embodiment. FIG. 8 shows similar operations (e.g., 606, 614a, 612, 618, among others), as described in relation to FIG. 6.

However, rather than the host CPU 105 becoming unavailable, in FIG. 8, the transition state tracker 200

(shown as 802*a*) is configured to operate in parallel with the host CPU 105 when it is overloaded. Indeed, once the load balancing operation (shown as "state tracking application" 308*a*) is initialized (804), the host CPU 105 pre-computes (806) the filters 204 to install (808) on the transition state tracker 802*a*. Processing of the control plane messages associated with the filter and monitoring (810) is performed by the transition state tracker 802*a* instead of the host CPU 105*a*.

Host CPU Load Sharing Application Using Example Protocol State Transition and/or Resource State Transition Tracker Referring back to FIG. 3, the examplary network device 300 may be alternatively, or additionally, configured with the protocol state transition and/or resource state transition tracker module 200 of FIG. 2A, 2B, or 2C to perform load sharing operations with the host CPU in accordance with an illustrative embodiment. As used herein, "load sharing" refers to the protocol state transition and/or resource state transition tracker module 200 performing filtering and/or updating of protocol state transitions or resource state transitions in parallel to control plane operations performed by the host CPU irrespective of the host CPU's availability or loading state. Indeed, the function of updating certain protocol state transition updates and/or certain hardware resource state transition updates has been off-loaded to the protocol state transition and/or resource state transition tracker module 200 entirely.

Referring still to FIG. 3 (and FIG. 5A or 5B), when the load sharing operation (shown as "Host CPU Load Sharing Application" 310) is initiated, the control-plane determines (step 502) a set of filtering rules and installs (step 504) filtering rules in the protocol state transition and/or resource state transition tracker module (e.g., 200*d*), e.g., in the data-plane. In some embodiments, the filtering rules may be derived, or received, from a network interface that provides for communication with a remote controller 306 (shown as "OpenFlow Controller" 306*a*).

The filters 204 (e.g., 204*a*-204*d*), in some embodiments, provide for the matching of state-transition messages for a set of protocols (e.g., those described herein). In some embodiments, for example, when a protocol's state update is communicated through a set of fields in that protocols' messages, the protocol state transition and/or resource state transition tracker module 200*d* is configured to look (step 506) for, e.g., scan, specific values in the fields and flags when a match is identified. In addition to specific protocol messages, the protocol state transition and/or resource state transition tracker module (e.g., 200*d*) may also track other events that may impact the forwarding topology (e.g., link down). The filtering logic may be implemented through a variety of hardware blocks (e.g., ACL TCAM). Any required resources are reserved at system startup.

Once the rules are configured in the protocol state transition and/or resource state transition tracker module 200*d* (e.g., in the data-plane), events associated with such rules that could impact the forwarding topology are flagged independently of the host CPU 105 by the protocol state transition and/or resource state transition tracker module (e.g., 200*d*). The tracked information is then used to perform the necessary updates (step 508) to the data-plane (such as shutting down an adjacency, blocking a port etc.) to minimize the negative impact on the network as described herein. FIG. 4 shows an exemplary network device 100 (shown as 400) configured to perform updates to data plane resources during load sharing operation, e.g., as described in relation to FIG. 3, in accordance with an illustrative embodiment.

Examples of secondary thread and secondary processing units that may execute the updater (e.g., 208*c*) is described in relation to FIGS. 12 and 13.

FIG. 8 shows an example timing diagram 800 of a method of executing load sharing operations in a network device configured with an exemplary protocol state transition and/or resource state transition tracker module (e.g., 200). Indeed, once the load sharing operation (also shown as "state tracking application" 308*a*) is initialized (804), the host CPU 105 pre-computes (806) the filters 204 to install (808) on the transition state tracker 802*a*. The host CPU 105*a* can then ignores control plane associated messages associated with the filter and such monitoring (810) is performed by the transition state tracker 802.

It should be understood that the various techniques and modules described herein, including the protocol state transition and/or resource state transition tracker module (e.g., 200) and/or protocol state updater (e.g., 208), may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Embodiments of the network device (e.g., 100) may be implemented, in whole or in part, in virtualized network hardware in addition to physical hardware.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents.

What is claimed is:

1. A network device comprising:
   a data-plane configured to route packets received at network ports of the network device to other network ports of the network device; and
   a host CPU executing instructions for control-plane operations that manage and maintain a plurality of data-plane-associated tables of a switch-fabric of the network device, the instructions when executed by the host CPU further computes a plurality of filters to identify protocol state and/or resource state transitions;
wherein the data plane comprises a processor unit or logic circuit configured to:
receive the plurality of filters computed by the host CPU; and
track, via the plurality of filters, protocol state and/or resource state transitions of the control-plane when the host CPU is in an unavailable or overloaded state;
wherein the tracked protocol state and/or resources are used, by the host CPU or the processor unit or logic circuit, to update the plurality of data-plane associated tables.

2. The network device of claim 1, wherein the processor unit or logic circuit is configured to update the plurality of data-plane associated tables when the host CPU is in the unavailable or overloaded state.

3. The network device of claim 1, wherein the tracked protocol state and/or resources are used by the host CPU to update the data-plane of a detected protocol state and/or resources when the host CPU transitions from the unavailable or overloaded state to an available state.

4. The network device of claim 1, wherein the tracked protocol state and/or resources are used by the processor unit or logic circuit to update the data-plane in parallel with host CPU operations.

5. The network device of claim 1, wherein the data-plane implements a filter to monitor for a specific protocol state transition in a received packet during the unavailable state of the host CPU and/or a specific resource state transition during the unavailable state of the host CPU.

6. The network device of claim 5, wherein the plurality of filters are pre-computed by the host CPU prior to the host CPU entering into the unavailable or overloaded state.

7. The network device of claim 6, wherein the processor unit or logic circuit are implemented in a packet classification engine, a packet-inspection engine, deep-packet inspection engine, an embedded micro-controller in data-plane, and/or access-control-list tertiary-content-address-memories (ACL TCAMs) located within a component of the data-plane.

8. The network device of claim 1, wherein the processor unit or logic circuit executes a plurality of filters for state-transitions for a set of protocols.

9. The network device of claim 8, wherein the plurality of filters includes a first filter configured to identify a link-aggregation-control-protocol protocol-data-unit (LACP PDU) indicating a protocol state or resource state change of the logical channel or one or more links within the channel.

10. The network device of claim 8, wherein the plurality of filters includes a second filter configured to identify a bridge protocol data unit (BPDU) indicating a Spanning Tree Protocol topology-change notification (TCN) message.

11. The network device of claim 8, wherein the plurality of filters includes a third filter configured to identify a hardware resource transition change.

12. The network device of claim 8, wherein the plurality of filters includes a third filter configured to identify a graceful insertion and removal operation of a peer network device.

13. The network device of claim 1, wherein the host CPU is configured to:
pre-compute a filter to monitor for a specific protocol or resource state transition in a received packet during the unavailable state of the host CPU.

14. The network device of claim 11, wherein the host CPU is configured to:
pre-compute updated data-plane entries to redistribute traffic to update the data-plane when the filter is matched.

15. The network device claim 1, wherein the processor unit or logic circuit is configured to:
monitor for (i) a specified protocol state transition in at least one of a received control packet and (ii) a specific resource state transition; and
update the data plane with pre-computed data-plane entries when specified protocol state transition or the specific resource state transition is detected.

16. The network device of claim 1, wherein the processor unit or logic circuit is configured to:
identify a received LACP PDU indicating a down-channel link of a peer network device; and
update the data plane that a link aggregation channel associated with a peer network device is down.

17. A method comprising:
performing, by a host CPU of a network device, control-plane operations that manage and maintain a plurality of data-plane-associated tables of a data plane of the network device;
computing, by the host CPU, a plurality of filters to identify protocol state and/or resource state transitions associated with the control plane operations; and
transmitting, by the host CPU, to a data-plane processor unit or logic circuit of the data plane, the plurality of computed filters;
receiving, by the processor unit or logic circuit, the plurality of transmitted filters; and
tracking, via the plurality of received filters, implemented in the data-plane processor unit or logic circuit, protocol state and/or resource state transitions of the control-plane when the host CPU is in an unavailable or overloaded state,
wherein the tracked protocol state and/or resource state transitions tracked by the plurality of received filters are used to update associated data plane resources.

18. A non-transitory computer-readable medium having instructions stored thereon, wherein execution of the instructions by a first processor comprising a processor unit/logic circuit to:
receive, from a data-plane interface, a plurality of filters to identify protocol state and/or resource state transitions associated with control plane operations, wherein the plurality of filters has been pre-computed by a host CPU or external CPU configured to perform control-plane operations that manage and maintain a plurality of data-plane-associated tables of a switch-fabric of the network device; and
track, via the plurality of received filters, implemented in the data-plane processor unit or logic circuit, protocol state and/or resource state transitions of the control-plane when the host CPU is in an unavailable or overloaded state,
wherein the tracked protocol state and/or resource state transitions tracked by the plurality of received filters are used to update associated data plane resources,
a data-plane configured to route packets received at network ports of the network device to other network ports of the network device; and
a host CPU executing instructions for control-plane operations that manage and maintain a plurality of data-plane-associated tables of a switch-fabric of the network device, the instructions when executed by the host CPU further computes a plurality of filters to identify protocol state and/or resource state transitions;
wherein the data plane comprises a processor unit or logic circuit configured to:
receive the plurality of filters computed by the host CPU; and
track, via the plurality of filters, protocol state and/or resource state transitions of the control-plane when the host CPU is in an unavailable or overloaded state;
wherein the tracked protocol state and/or resources are used, by the host CPU or the processor unit or logic circuit, to update the plurality of data-plane associated tables.

* * * * *